US011132213B1

(12) United States Patent
Wagner et al.

(10) Patent No.: US 11,132,213 B1
(45) Date of Patent: Sep. 28, 2021

(54) DEPENDENCY-BASED PROCESS OF PRE-EXISTING DATA SETS AT AN ON DEMAND CODE EXECUTION ENVIRONMENT

(71) Applicant: Amazon Technologies, Inc., Seattle, WA (US)

(72) Inventors: Timothy Allen Wagner, Seattle, WA (US); Marc John Brooker, Seattle, WA (US); Ajay Nair, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 15/085,912

(22) Filed: Mar. 30, 2016

(51) Int. Cl.
  *G06F 12/08* (2016.01)
  *G06F 9/455* (2018.01)
  (Continued)

(52) U.S. Cl.
  CPC ...... *G06F 9/45558* (2013.01); *G06F 9/45516* (2013.01); *G06F 12/0862* (2013.01);
  (Continued)

(58) Field of Classification Search
  CPC .................. G06F 12/0862; G06F 2212/602
  See application file for complete search history.

(56) References Cited

U.S. PATENT DOCUMENTS

| 4,949,254 A | 8/1990 | Shorter |
| 5,283,888 A | 2/1994 | Dao et al. |

(Continued)

FOREIGN PATENT DOCUMENTS

| CA | 2975522 A1 | 8/2016 |
| CN | 1341238 A | 3/2002 |

(Continued)

OTHER PUBLICATIONS

Adapter Pattern, Wikipedia, https://en.wikipedia.org/w/index.php?title=Adapter_pattern&oldid=654971255, [retrieved May 26, 2016], 6 pages.

(Continued)

*Primary Examiner* — Jason W Blust
*Assistant Examiner* — Eric T Loonan
(74) *Attorney, Agent, or Firm* — Knobbe, Martens, Olson & Bear, LLP

(57) ABSTRACT

Systems and methods are described for transforming a data set within a data source into a series of task calls to an on-demand code execution environment. The environment can utilize pre-initialized virtual machine instances to enable execution of user-specified code in a rapid manner, without delays typically caused by initialization of the virtual machine instances, and are often used to process data in near-real time, as it is created. However, limitations in computing resources may inhibit a user from utilizing an on-demand code execution environment to simultaneously process a large, existing data set. The present application provides a task generation system that can iteratively retrieve data items from an existing data set and generate corresponding task calls to the on-demand computing environment. The calls can be ordered to address dependencies of the data items, such as when a first data item depends on prior processing of a second data item.

27 Claims, 8 Drawing Sheets

(51) Int. Cl.
    *G06F 12/0875*     (2016.01)
    *G06F 12/0862*     (2016.01)

(52) U.S. Cl.
    CPC .. *G06F 12/0875* (2013.01); *G06F 2009/4557* (2013.01); *G06F 2212/283* (2013.01); *G06F 2212/452* (2013.01); *G06F 2212/453* (2013.01)

(56) References Cited

U.S. PATENT DOCUMENTS

| | | | |
|---|---|---|---|
| 5,835,764 | A | 11/1998 | Platt et al. |
| 5,970,488 | A | 10/1999 | Crowe et al. |
| 5,983,197 | A | 11/1999 | Enta |
| 6,237,005 | B1 | 5/2001 | Griffin |
| 6,260,058 | B1 | 7/2001 | Hoenninger et al. |
| 6,385,636 | B1 | 5/2002 | Suzuki |
| 6,463,509 | B1* | 10/2002 | Teoman ............... G06F 9/4401 711/113 |
| 6,501,736 | B1 | 12/2002 | Smolik et al. |
| 6,523,035 | B1 | 2/2003 | Fleming et al. |
| 6,549,936 | B1 | 4/2003 | Hirabayashi |
| 6,708,276 | B1 | 3/2004 | Yarsa et al. |
| 7,036,121 | B1 | 4/2006 | Casabona et al. |
| 7,308,463 | B2 | 12/2007 | Taulbee et al. |
| 7,340,522 | B1 | 3/2008 | Basu et al. |
| 7,558,719 | B1 | 7/2009 | Donlin |
| 7,577,722 | B1 | 8/2009 | Khandekar et al. |
| 7,590,806 | B2 | 9/2009 | Harris et al. |
| 7,665,090 | B1 | 2/2010 | Tormasov et al. |
| 7,707,579 | B2 | 4/2010 | Rodriguez |
| 7,730,464 | B2 | 6/2010 | Trowbridge |
| 7,774,191 | B2 | 8/2010 | Berkowitz et al. |
| 7,823,186 | B2 | 10/2010 | Pouliot |
| 7,831,464 | B1 | 11/2010 | Nichols et al. |
| 7,870,153 | B2 | 1/2011 | Croft et al. |
| 7,886,021 | B2 | 2/2011 | Scheifler et al. |
| 7,949,677 | B2 | 5/2011 | Croft et al. |
| 7,954,150 | B2 | 5/2011 | Croft et al. |
| 8,010,679 | B2 | 8/2011 | Low et al. |
| 8,010,990 | B2 | 8/2011 | Ferguson et al. |
| 8,024,564 | B2 | 9/2011 | Bassani et al. |
| 8,046,765 | B2 | 10/2011 | Cherkasova et al. |
| 8,051,180 | B2 | 11/2011 | Mazzaferri et al. |
| 8,051,266 | B2 | 11/2011 | DeVal et al. |
| 8,065,676 | B1 | 11/2011 | Sahai et al. |
| 8,065,682 | B2 | 11/2011 | Baryshnikov et al. |
| 8,095,931 | B1 | 1/2012 | Chen et al. |
| 8,127,284 | B2 | 2/2012 | Meijer et al. |
| 8,146,073 | B2 | 3/2012 | Sinha |
| 8,166,304 | B2 | 4/2012 | Murase et al. |
| 8,171,473 | B2 | 5/2012 | Lavin |
| 8,201,026 | B1 | 6/2012 | Bornstein et al. |
| 8,209,695 | B1 | 6/2012 | Pruyne et al. |
| 8,219,987 | B1 | 7/2012 | Vlaovic et al. |
| 8,296,267 | B2 | 10/2012 | Cahill et al. |
| 8,321,554 | B2 | 11/2012 | Dickinson |
| 8,321,558 | B1 | 11/2012 | Sirota et al. |
| 8,336,079 | B2 | 12/2012 | Budko et al. |
| 8,352,608 | B1 | 1/2013 | Keagy et al. |
| 8,387,075 | B1 | 2/2013 | McCann et al. |
| 8,392,558 | B1 | 3/2013 | Ahuja et al. |
| 8,417,723 | B1 | 4/2013 | Lissack et al. |
| 8,429,282 | B1 | 4/2013 | Ahuja |
| 8,448,165 | B1 | 5/2013 | Conover |
| 8,479,195 | B2 | 7/2013 | Adams et al. |
| 8,490,088 | B2 | 7/2013 | Tang |
| 8,555,281 | B1 | 10/2013 | Van Dijk et al. |
| 8,560,699 | B1 | 10/2013 | Theimer et al. |
| 8,566,835 | B2 | 10/2013 | Wang et al. |
| 8,601,323 | B2 | 12/2013 | Tsantilis |
| 8,613,070 | B1 | 12/2013 | Borzycki et al. |
| 8,615,589 | B1 | 12/2013 | Adogla et al. |
| 8,631,130 | B2 | 1/2014 | Jackson |
| 8,667,471 | B2 | 3/2014 | Wintergerst et al. |
| 8,677,359 | B1 | 3/2014 | Cavage et al. |
| 8,694,996 | B2 | 4/2014 | Cawlfield et al. |
| 8,700,768 | B2 | 4/2014 | Benari |
| 8,719,415 | B1 | 5/2014 | Sirota et al. |
| 8,725,702 | B1 | 5/2014 | Raman et al. |
| 8,756,322 | B1 | 6/2014 | Lynch |
| 8,756,696 | B1 | 6/2014 | Miller |
| 8,769,519 | B2 | 7/2014 | Leitman et al. |
| 8,793,676 | B2 | 7/2014 | Quinn et al. |
| 8,799,236 | B1 | 8/2014 | Azari et al. |
| 8,799,879 | B2 | 8/2014 | Wright et al. |
| 8,806,468 | B2 | 8/2014 | Meijer et al. |
| 8,806,644 | B2 | 8/2014 | McCorkendale et al. |
| 8,819,679 | B2 | 8/2014 | Agarwal et al. |
| 8,825,863 | B2 | 9/2014 | Hansson et al. |
| 8,825,964 | B1 | 9/2014 | Sopka et al. |
| 8,839,035 | B1 | 9/2014 | Dimitrovich et al. |
| 8,850,432 | B2 | 9/2014 | Mcgrath et al. |
| 8,869,300 | B2 | 10/2014 | Singh et al. |
| 8,874,952 | B2 | 10/2014 | Tameshige et al. |
| 8,904,008 | B2 | 12/2014 | Calder et al. |
| 8,966,495 | B2 | 2/2015 | Kulkarni |
| 8,972,980 | B2 | 3/2015 | Banga et al. |
| 8,997,093 | B2 | 3/2015 | Dimitrov |
| 9,027,087 | B2 | 5/2015 | Ishaya et al. |
| 9,038,068 | B2 | 5/2015 | Engle et al. |
| 9,052,935 | B1 | 6/2015 | Rajaa |
| 9,086,897 | B2 | 6/2015 | Oh et al. |
| 9,086,924 | B2 | 7/2015 | Barsness et al. |
| 9,092,837 | B2 | 7/2015 | Bala et al. |
| 9,098,528 | B2 | 8/2015 | Wang |
| 9,110,732 | B1 | 8/2015 | Forschmiedt et al. |
| 9,110,770 | B1 | 8/2015 | Raju et al. |
| 9,111,037 | B1 | 8/2015 | Nalis et al. |
| 9,112,813 | B2 | 8/2015 | Jackson |
| 9,116,733 | B2 | 8/2015 | Banga et al. |
| 9,141,410 | B2 | 9/2015 | Leafe et al. |
| 9,146,764 | B1 | 9/2015 | Wagner |
| 9,152,406 | B2 | 10/2015 | De et al. |
| 9,164,754 | B1 | 10/2015 | Pohlack |
| 9,183,019 | B2 | 11/2015 | Kruglick |
| 9,208,007 | B2 | 12/2015 | Harper et al. |
| 9,218,190 | B2 | 12/2015 | Anand et al. |
| 9,223,561 | B2 | 12/2015 | Orveillon et al. |
| 9,223,966 | B1 | 12/2015 | Satish et al. |
| 9,250,893 | B2 | 2/2016 | Blahaerath et al. |
| 9,268,586 | B2 | 2/2016 | Voccio et al. |
| 9,298,633 | B1* | 3/2016 | Zhao ............... G06F 12/0862 |
| 9,317,689 | B2 | 4/2016 | Aissi |
| 9,323,556 | B2 | 4/2016 | Wagner |
| 9,361,145 | B1 | 6/2016 | Wilson et al. |
| 9,413,626 | B2 | 8/2016 | Reque et al. |
| 9,417,918 | B2 | 8/2016 | Chin et al. |
| 9,436,555 | B2 | 9/2016 | Dornemann et al. |
| 9,461,996 | B2 | 10/2016 | Hayton et al. |
| 9,471,775 | B1 | 10/2016 | Wagner et al. |
| 9,471,776 | B2 | 10/2016 | Gu et al. |
| 9,483,335 | B1 | 11/2016 | Wagner et al. |
| 9,489,227 | B2 | 11/2016 | Oh et al. |
| 9,497,136 | B1 | 11/2016 | Ramarao et al. |
| 9,501,345 | B1 | 11/2016 | Lietz et al. |
| 9,514,037 | B1 | 12/2016 | Dow et al. |
| 9,537,788 | B2 | 1/2017 | Reque et al. |
| 9,563,613 | B1 | 2/2017 | Dinkel et al. |
| 9,575,798 | B2 | 2/2017 | Terayama et al. |
| 9,588,790 | B1 | 3/2017 | Wagner et al. |
| 9,594,590 | B2 | 3/2017 | Hsu |
| 9,596,350 | B1 | 3/2017 | Dymshyts et al. |
| 9,600,312 | B2 | 3/2017 | Wagner et al. |
| 9,613,127 | B1 | 4/2017 | Rus et al. |
| 9,626,204 | B1 | 4/2017 | Banga et al. |
| 9,628,332 | B2 | 4/2017 | Bruno, Jr. et al. |
| 9,635,132 | B1 | 4/2017 | Lin et al. |
| 9,652,306 | B1 | 5/2017 | Wagner et al. |
| 9,652,617 | B1 | 5/2017 | Evans et al. |
| 9,654,508 | B2 | 5/2017 | Barton et al. |
| 9,661,011 | B1 | 5/2017 | Van Horenbeeck et al. |
| 9,678,773 | B1 | 6/2017 | Wagner et al. |
| 9,678,778 | B1 | 6/2017 | Youseff |
| 9,703,681 | B2 | 7/2017 | Taylor et al. |
| 9,715,402 | B2 | 7/2017 | Wagner et al. |

(56) References Cited

U.S. PATENT DOCUMENTS

| | | |
|---|---|---|
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,623,476 B2 | 4/2020 | Thompson |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0191795 A1 | 10/2003 | Bernardin et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | Mccarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2006/0010440 A1 | 1/2006 | Anderson et al. |
| 2006/0015740 A1 | 1/2006 | Kramer |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0248195 A1 | 11/2006 | Toumura et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |

(56) References Cited

U.S. PATENT DOCUMENTS

| | | |
|---|---|---|
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1* | 12/2011 | Rastogi .............. G06F 9/4881 718/102 |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |

(56) References Cited

U.S. PATENT DOCUMENTS

| | | |
|---|---|---|
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | Mcgrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wsnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault et al. |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0359093 A1 | 12/2014 | Raju et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1* | 5/2015 | Chin ................. G06F 9/485 718/104 |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0264014 A1 | 9/2015 | Budhani et al. |

(56) References Cited

U.S. PATENT DOCUMENTS

| | | |
|---|---|---|
| 2015/0269494 A1 | 9/2015 | Kardes et al. |
| 2015/0289220 A1 | 10/2015 | Kim et al. |
| 2015/0309923 A1* | 10/2015 | Iwata .................. G06F 3/064 711/105 |
| 2015/0319160 A1 | 11/2015 | Ferguson et al. |
| 2015/0324174 A1 | 11/2015 | Bromley et al. |
| 2015/0324182 A1 | 11/2015 | Barros et al. |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092250 A1 | 3/2016 | Wagner et al. |
| 2016/0092252 A1 | 3/2016 | Wagner |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1* | 4/2016 | Susarla .................. G06F 12/0862 711/119 |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0203219 A1 | 7/2016 | Hoch et al. |
| 2016/0212007 A1 | 7/2016 | Alatorre et al. |
| 2016/0224360 A1 | 8/2016 | Wagner et al. |
| 2016/0224785 A1 | 8/2016 | Wagner et al. |
| 2016/0226955 A1 | 8/2016 | Moorthi et al. |
| 2016/0239318 A1 | 8/2016 | Wagner |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0299790 A1 | 10/2016 | Thompson |
| 2016/0301739 A1 | 10/2016 | Thompson |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0090961 A1 | 3/2017 | Wagner et al. |
| 2017/0093684 A1 | 3/2017 | Jayaraman et al. |
| 2017/0093920 A1 | 3/2017 | Ducatel et al. |
| 2017/0116051 A1 | 4/2017 | Wagner et al. |
| 2017/0134519 A1 | 5/2017 | Chen et al. |
| 2017/0147656 A1 | 5/2017 | Choudhary et al. |
| 2017/0149740 A1 | 5/2017 | Mansour et al. |
| 2017/0161059 A1 | 6/2017 | Wood et al. |
| 2017/0177391 A1 | 6/2017 | Wagner et al. |
| 2017/0177854 A1 | 6/2017 | Gligor et al. |
| 2017/0188213 A1 | 6/2017 | Nirantar et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286143 A1 | 10/2017 | Wagner et al. |
| 2017/0286156 A1 | 10/2017 | Wagner et al. |
| 2017/0286187 A1 | 10/2017 | Chen et al. |
| 2017/0308520 A1 | 10/2017 | Beahan, Jr. et al. |
| 2017/0315163 A1 | 11/2017 | Wang et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371703 A1 | 12/2017 | Wagner et al. |
| 2017/0371720 A1 | 12/2017 | Basu et al. |
| 2017/0371724 A1 | 12/2017 | Wagner et al. |
| 2017/0372142 A1 | 12/2017 | Bilobrov |
| 2018/0004553 A1 | 1/2018 | Wagner et al. |
| 2018/0004555 A1 | 1/2018 | Ramanathan et al. |
| 2018/0004556 A1 | 1/2018 | Marriner et al. |
| 2018/0004572 A1 | 1/2018 | Wagner et al. |
| 2018/0004575 A1 | 1/2018 | Marriner et al. |
| 2018/0039506 A1 | 2/2018 | Wagner et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0121245 A1 | 5/2018 | Wagner et al. |
| 2018/0121665 A1 | 5/2018 | Anderson et al. |
| 2018/0129684 A1 | 5/2018 | Wilson et al. |
| 2018/0143865 A1 | 5/2018 | Wagner et al. |
| 2018/0150339 A1 | 5/2018 | Pan et al. |
| 2018/0157568 A1 | 6/2018 | Wagner |
| 2018/0192101 A1 | 7/2018 | Bilobrov |
| 2018/0203717 A1 | 7/2018 | Wagner et al. |
| 2018/0225096 A1 | 8/2018 | Mishra et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0309819 A1 | 10/2018 | Thompson |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2019/0004866 A1 | 1/2019 | Du et al. |
| 2019/0028552 A1 | 1/2019 | Johnson, II et al. |
| 2019/0043231 A1 | 2/2019 | Uzgin et al. |
| 2019/0050271 A1 | 2/2019 | Marriner et al. |

(56) References Cited

U.S. PATENT DOCUMENTS

| | | |
|---|---|---|
| 2019/0072529 A1 | 3/2019 | Andrawes et al. |
| 2019/0073234 A1 | 3/2019 | Wagner et al. |
| 2019/0079751 A1 | 3/2019 | Foskett et al. |
| 2019/0102231 A1 | 4/2019 | Wagner |
| 2019/0108058 A1 | 4/2019 | Wagner et al. |
| 2019/0140831 A1 | 5/2019 | De Lima Junior et al. |
| 2019/0147085 A1 | 5/2019 | Pal et al. |
| 2019/0155629 A1 | 5/2019 | Wagner et al. |
| 2019/0171423 A1 | 6/2019 | Mishra et al. |
| 2019/0171470 A1 | 6/2019 | Wagner |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0205171 A1 | 7/2019 | Brooker et al. |
| 2019/0227849 A1 | 7/2019 | Wisniewski et al. |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0318312 A1 | 10/2019 | Foskett et al. |
| 2019/0361802 A1 | 11/2019 | Li et al. |
| 2019/0363885 A1 | 11/2019 | Schiavoni et al. |
| 2019/0384647 A1 | 12/2019 | Reque et al. |
| 2019/0391834 A1 | 12/2019 | Mullen et al. |
| 2019/0391841 A1 | 12/2019 | Mullen et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0057680 A1 | 2/2020 | Marriner et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0104198 A1 | 4/2020 | Hussels et al. |
| 2020/0104378 A1 | 4/2020 | Wagner et al. |
| 2020/0110691 A1 | 4/2020 | Bryant et al. |
| 2020/0120120 A1 | 4/2020 | Cybulski |
| 2020/0142724 A1 | 5/2020 | Wagner et al. |
| 2020/0153897 A1 | 5/2020 | Mestery et al. |
| 2020/0167208 A1 | 5/2020 | Floes et al. |
| 2020/0192707 A1 | 6/2020 | Brooker et al. |
| 2020/0213151 A1 | 7/2020 | Srivatsan et al. |
| 2020/0341799 A1 | 10/2020 | Wagner et al. |
| 2020/0366587 A1 | 11/2020 | White et al. |
| 2020/0412707 A1 | 12/2020 | Siefker et al. |
| 2020/0412720 A1 | 12/2020 | Siefker et al. |
| 2020/0412825 A1 | 12/2020 | Siefker et al. |
| 2021/0081233 A1 | 3/2021 | Mullen et al. |

FOREIGN PATENT DOCUMENTS

| | | |
|---|---|---|
| CN | 101002170 A | 7/2007 |
| CN | 101345757 A | 1/2009 |
| CN | 101496005 A | 7/2009 |
| EP | 2663052 A1 | 11/2013 |
| EP | 3201762 A1 | 8/2017 |
| EP | 3254434 A1 | 12/2017 |
| EP | 3201768 B1 | 12/2019 |
| JP | 2002287974 A | 10/2002 |
| JP | 2006-107599 A | 4/2006 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| KR | 10-357850 B1 | 10/2002 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/069104 A1 | 4/2020 |

OTHER PUBLICATIONS

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

Espadas, J., et al., A Tenant-Based Resource Allocation Model for Scaling Software-as-a-Service Applications Over Cloud Computing Infrastructures, Future Generation Computer Systems, vol. 29, pp. 273-286, Oct. 2011.

Nakajima, J., et al., Optimizing Virtual Machines Using Hybrid Virtualization, SAC '11, Mar. 21-25, 2011, TaiChung, Taiwan, pp. 573-578.

Qian, H. and D.Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2015/052810 dated Dec. 17, 2015.

International Search Report and Written Opinion in PCT/US2015/052838 dated Dec. 18, 2015.

International Search Report and Written Opinion in PCT/US2015/052833 dated Jan. 13, 2016.

International Search Report and Written Opinion in PCT/US2015/064071dated Mar. 16, 2016.

International Search Report and Written Opinion in PCT/US2016/016211 dated Apr. 13, 2016.

International Search Report and Written Opinion in PCT/US2016/026514 dated Jun. 8, 2016.

International Search Report and Written Opinion in PCT/US2016/026520 dated Jul. 5, 2016.

International Search Report and Written Opinion in PCT/US2016/054774 dated Dec. 16, 2016.

Anonymous: "Docker run reference", Dec. 7, 2015, XP055350246, Retrieved from the Internet:URL:https://web.archive.org/web/20151207111702/https:/docs.docker.com/engine/reference/run/ [retrieved on Feb. 28, 2017].

(56) References Cited

OTHER PUBLICATIONS

Amazon, "AWS Lambda: Developer Guide", Retrieved from the Internet, Jun. 26, 2016, URL : http://docs.aws.amazon.com/lambda/latest/dg/lambda-dg.pdf.
Hoffman, Auto scaling your website with Amazon Web Services (AWS)—Part 2, Cardinalpath, Sep. 2015, 15 pages.
Kamga et al., Extended scheduler for efficient frequency scaling in virtualized systems, Jul. 2012, 8 pages.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Merkel, "Docker: Lightweight Linux Containers for Consistent Development and Deployment", Linux Journal, vol. 2014 Issue 239, Mar. 2014, XP055171140, 16 pages.
Yamasaki et al. "Model-based resource selection for efficient virtual cluster deployment", Virtualization Technology in Distributed Computing, ACM, Nov. 2007, pp. 1-7.
International Preliminary Report on Patentability in PCT/US2015/052810 dated Apr. 4, 2017.
Extended Search Report in European Application No. dated May 3, 2018.
International Preliminary Report on Patentability in PCT/US2015/052838 dated Apr. 4, 2017.
International Preliminary Report on Patentability in PCT/US2015/052833 dated Apr. 4, 2017.
International Preliminary Report on Patentability in PCT/US2015/064071 dated Jun. 6, 2017.
International Preliminary Report on Patentability in PCT/US2016/016211 dated Aug. 17, 2017.
International Preliminary Report on Patentability in PCT/US2016/026514 dated Oct. 10, 2017.
International Preliminary Report on Patentability in PCT/US2016/026520 dated Oct. 10, 2017.
International Preliminary Report on Patentability in PCT/US2016/054774 dated Apr. 3, 2018.
International Search Report and Written Opinion in PCT/US2016/066997 dated Mar. 20, 2017.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.
Bhadani et al., Performance evaluation of web servers using central load balancing policy over virtual machines on cloud, Jan. 2010, 4 pages.
Meng et al., Efficient resource provisioning in compute clouds via VM multiplexing, Jun. 2010, 10 pages.
Sakamoto, et al. "Platform for Web Services using Proxy Server"; Research Report from Information Processing Society, Mar. 22, 2002, vol. 2002, No. 31.
Tan et al., Provisioning for large scale cloud computing services, Jun. 2012, 2 pages.
Wu et al., HC-Midware: A Middleware to Enable High Performance Communication System Simulation in Heterogeneous Cloud, Association for Computing Machinery, Oct. 20-22, 2017, 10 pages.
Extended Search Report in European Application No. 15847202.7 dated Sep. 9, 2018.
Extended Search Report in European Application No. 15846542.7 dated Aug. 27, 2018.
International Preliminary Report on Patentability in PCT/US2016/066997 dated Jun. 26, 2018.
International Preliminary Report on Patentability in PCT/US/2017/023564 dated Oct. 2, 2018.
International Preliminary Report on Patentability in PCT/US2017/040054 dated Jan. 1, 2019.
International Preliminary Report on Patentability in PCT/US2017/039514 dated Jan. 1, 2019.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Kato, et al. "Web Service Conversion Architecture of the Web Application and Evaluation"; Research Report from Information Processing Society, Apr. 3, 2006 with Machine Translation.
Wikipedia Recursion web page from date Mar. 26, 2015, retrieved using the WayBackMachine, from https://web.archive.org/web/20150326230100/https://en.wikipedia.org/wiki/Recursion_(computer _science), 2015.
Extended European Search Report in application No. 17776325.7 dated Oct. 23, 2019.
Tange, "GNU Parallel: The Command-Line Power Tool", vol. 36, No. 1, pp. 42-47, Feb. 2011.
Wikipedia "API" pages from date Apr. 7, 2015, retrieved using the WayBackMachine from https://web.archive.org/web/20150407191158/https://en .wikipedia.org/wiki/Application_programming_interface.
Extended Search Report in European Application No. 19199402.9 dated Mar. 6, 2020.
Office Action in European Application No. 17743108.7 dated Jan. 14, 2020.
Lagar-Cavilla, H. Andres, et al. "Snowflock: Virtual machine cloning as a first-class cloud primitive." ACM Transactions on Computer Systems (TOCS) 29.1 (2011): 1-45. (Year: 2011), Apr. 2009.
Office Action in European Application No. 17776325.7 dated Apr. 12, 2021.
Bebenita et al., "Trace-Based Compilation in Execution Environments without Interpreters," ACM, Copyright 2010, 10 pages, Sep. 2010.
Bryan Liston, "Ad Hoc Big Data Processing Made Simple with Serverless Map Reduce", Nov. 4, 2016, Amazon Web Services <https :/laws. amazon .com/bl ogs/compute/ad-hoc-big-data-processi ng-made-si mple-with-serverless-mapred uce >.
Search Query Report from IP.com, performed Dec. 2, 2020.
Wood, Timothy, et al. "Cloud Net: dynamic pooling of cloud resources by live WAN migration of virtual machines." ACM Sigplan Notices 46.7 (2011): 121-132. (Year: 2011), Mar. 2011.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Office Action in Canadian Application No. 2,962,633 dated May 21, 2020.
Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.
Office Action in Indian Application No. 201717013356 dated Jan. 22, 2021.
Office Action in Japanese Application No. 2017-516168 dated Mar. 26, 2018.
Office Action in Indian Application No. 201717019903 dated May 18, 2020.
Office Action in Australian Application No. 2016215438 dated Feb. 26, 2018.

(56) References Cited

OTHER PUBLICATIONS

Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21, 2020.
First Examination Report for Indian Application No. 201717034806 dated Jun. 25, 2020.
Office Action in European Application No. 16781265.0 dated Jul. 13, 2020.
Office Action in European Application No. 201817013748 dated Nov. 20, 2020.
Office Action in European Application No. 17743108.7 dated Dec. 22, 2020.
International Search Report and Written Opinion dated Oct. 15, 2019 for International Application No. PCT/US2019/039246 in 16 pages.
International Preliminary Report on Patentability dated Dec. 29, 2020 for International Application No. PCT/US2019/039246 in 8 pages.
International Search Report for Application No. PCT/US2019/038520 dated Aug. 14, 2019.
International Preliminary Report on Patentability for Application No. PCT/US2019/038520 dated Dec. 29, 2020.
International Search Report and Written Opinion in PCT/US2019/053123 dated Jan. 7, 2020.
International Search Report for Application No. PCT/US2019/065365 dated Mar. 19, 2020.
International Search Report for Application No. PCT/US2020/039996 dated Oct. 8, 2020.
International Search Report for Application No. PCT/US2020/062060 dated Mar. 5, 2021.

* cited by examiner

DEPENDENCY-BASED PROCESS OF PRE-EXISTING DATA SETS AT AN ON DEMAND CODE EXECUTION ENVIRONMENT

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
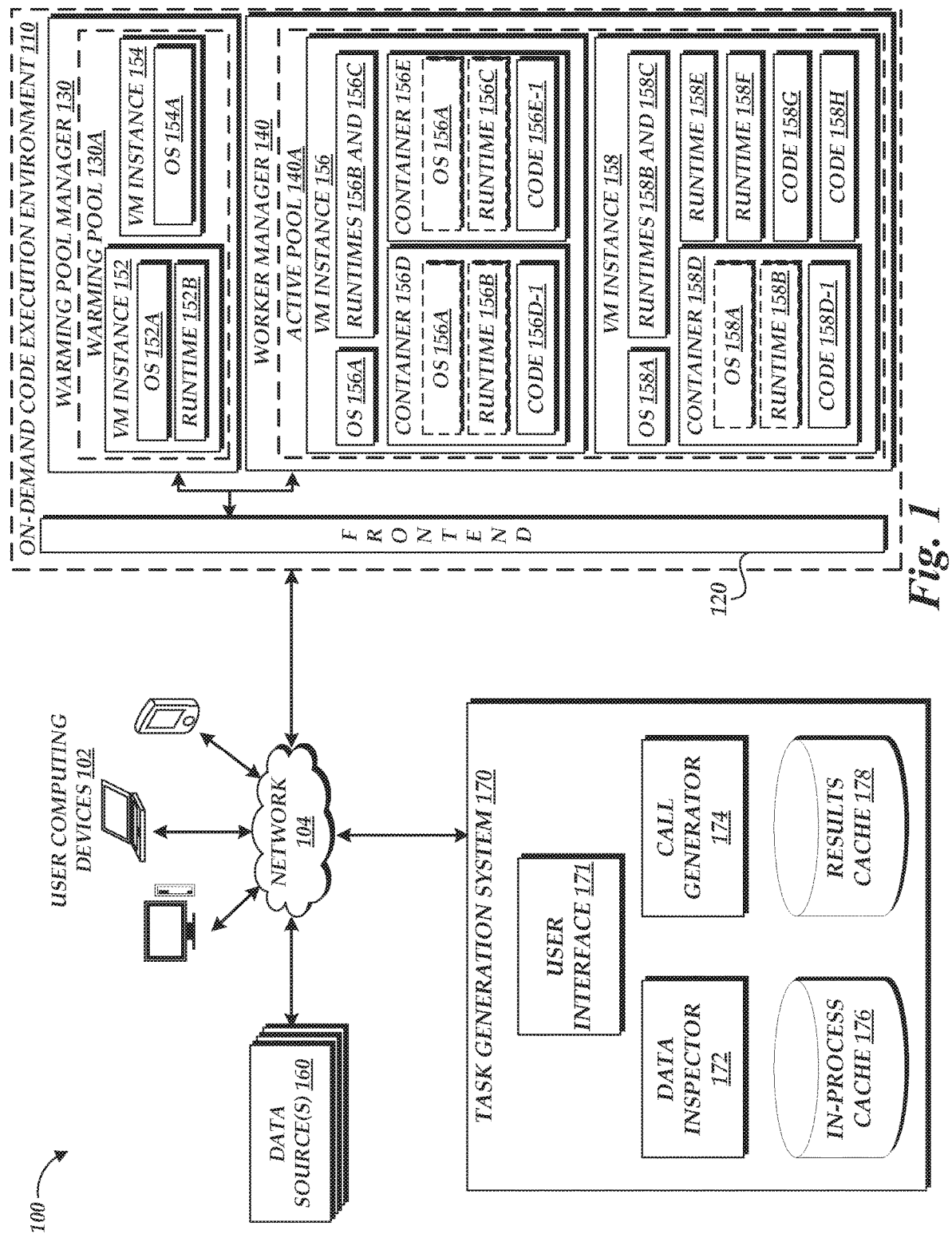
FIG. 1 is a block diagram depicting an illustrative environment in which a task generation system can interact with data sources and an on-demand code execution environment to generate a stream of requests to the on-demand code execution environment based on data within the data source.

Generally described, aspects of the present disclosure relate to utilizing a set of data items within a data store to generate and submit task executions to an on-demand code execution environment. As described in detail herein, an on-demand code execution environment may provide a network-accessible service enabling users to submit or designate computer-executable code to be executed by virtual machine instances of the on-demand code execution environment. Each set of code on the on-demand code execution environment may define a "task," and implement specific functionality corresponding to that task when executed on the on-demand code execution environment. Individual implementations of the task on the on-demand code execution environment may be referred to as an "execution" of the task. Generally, the on-demand code execution environment may operate by executing tasks in response to user-specified events, which may also be referred to as "triggering" events, such as transmission of an application programming interface ("API") call or a specially formatted hypertext transport protocol ("HTTP") packet. Such execution can enable users to utilize the on-demand code execution environment to execute any specified executable code, without requiring configuration or maintenance of the underlying hardware or infrastructure on which the code is executed. Often, triggering events correspond to changes in data at a remote data store, such as the uploading of a new document or photograph, or posting of a news item. This triggering event results in execution of code at the on-demand code execution environment to process the recently changed data (e.g., by transforming the data according to the specifications of the user). Thus, the on-demand code execution environment provides a mechanism for executing tasks based on "streams" of data, where incremental changes to a data source occur over time. However, in some instances, users may also wish to utilize the on-demand code execution environment to process existing data, such as historical records of documents or photographs previously submitted to a data store. Where this existing data is relatively small, the user may simply submit each item of data to the on-demand code execution environment for processing via a defined task. However, in the case where existing data is large (e.g., where a large number of past documents, photographs, or news items exist within a database), it may be impossible or impractical to simultaneously execute tasks to process all data items from an existing data set (e.g., due to constrains in speed of communication between the data store and the on-demand execution environment or due to limitations in computing power in either the data store or the on-demand code execution environment). Problems associated with processing of large existing data sets may be particularly prevalent with respect to new users of such systems, as such users may be required to migrate data sets previously organized or processed according to other systems. These problems may therefore inhibit adoption of an on-demand code execution environment by users. Embodiments of the present disclosure address this issue by providing a request generating system that enables data items from an existing data set to be submitted for processing on the on-demand code execution environment over time. Illustratively, the task generation system can utilize data items from an existing data set to generate a "stream" of calls to the on-demand code execution environment, effectively transforming a generally static set of existing data into a format similar to the dynamic data sets typically processed by the on-demand code execution environment.

In some instances, data items within an existing data set may be static and uniquely identified. Thus, the task generation system disclosed herein may iteratively retrieve data items from a data source (e.g., a network-accessible data store), generate task calls to the on-demand code execution environment to process the data items, and confirm that called tasks have executed successfully, until all data items have been processed at the on-demand code execution environment. However, in other instances, data items within an existing data set may not be entirely static, or may not be uniquely identified. The task generation system disclosed herein may therefore operate to ensure that each data item within an existing data set is processed at least once, and to detect and appropriately handle data items that are changed within a data source during processing of the data set at the on-demand code execution environment.

To ensure that each data item within an existing data set is processed at least once, the task generation system disclosed herein may generate or obtain a unique identifier for each data item, and utilize that unique identifier to track the status of a task on the on-demand code execution environment with respect to that data item. Illustratively, the task generation system may maintain a listing of data items that have not yet been submitted for processing to the on-demand code execution environment, a listing of data items that have been submitted for processing at the on-demand code execution environment but not yet processed, and a listing of data items that have been processed at the on-demand code execution environment. When a data item is read from a data source, the task generation system may compare a unique identifier for the data item against the above-noted listings of data items, to ensure that the data item has not already been or is not already being processed. The task generation system can then continue to query the data source for data items until all data items have been read and verified as processed or in-process at the task generation system. Further, the task generation system can interact with the on-demand code execution environment to ensure that processing for individual data items is successful, and if it is not successful, to either resubmit the individual data item for processing at the on-demand code execution environment or to record the data item as unable to be processed successfully. Thus, the task generation system can operate to ensure that each data item within a data source is processed (either successfully or unsuccessfully) at the on-demand code execution environment.

Where a unique identifier for each data item within a data set (e.g., a database key) is unavailable, the task generation system may function to generate a unique identifier for the data item. Illustratively, the task generation system may pass all or a portion of the data corresponding to a data item through a hash function (examples of which are known in the art) to transform the data into a hash value, and may thereafter utilize the hash value as a unique identifier for the data item. In another embodiment, the task generation system may utilize a combination of attributes from a data item, such as a combination of last edited time and the first 128 bytes of the data item, as a unique identifier for the data item. As noted above, this unique identifier can then be utilized throughout the task generation system to track whether the data item has been processed at the on-demand code execution environment. As used herein, the term "unique" is used with respect to identifiers to indicate an acceptable statistical likelihood that the identifier uniquely identifies the data item, and not necessarily to indicate that an absolute uniqueness of the identifier. For example, the task generation system may utilize a hash function to transform data from a data item into a hash value, and utilize that hash value as a unique identifier, despite the fact that a collision of two hash values is possible but statistically unlikely. The "uniqueness" of an identifier required for its use by the task generation system may be varied according to the requirements of the system. For example, more unique identifiers may be more computationally difficult to calculate, but provide a greater likelihood that no overlap between identifiers occurs. Conversely, less unique identifiers may require less computing power to generate, but increase the likelihood of an overlap in identifiers (which may result, for example, in data items not being processed by the on-demand code execution environment).

While data items within a data set may generally be static, in some instances one or more data items may be modified after initially being read by the task generation system. The task generation system may therefore by configured to detect modified data items, and to handle such modifications in a manner prescribed by an administrator of the task generation system or by a user who has requested that a set of data items be processed at the on-demand code execution environment. Modified data items may be detected in a number of ways, including detecting a change to a specific attribute of the data item (e.g., a "time modified" attribute), or a change to the underlying data within a data item (e.g., as represented by a hash value generated by passing the underlying data through a hash function). In some instances, modified data items may be treated by the task generation system as a new data item, and may be used to generate a new call to a task at the on-demand code execution environment. Additionally or alternatively, modified data items may be reported to a user of the task generation system. In yet other instances, modified data items may be used to generate a call to a different task on the on-demand code execution environment, such as a task corresponding to user-defined executable code that processes the modified data item while overwriting or deprecating the results of any past tasks executed with respect to prior versions of the data item. Accordingly, the task generation system may be configured to transform an existing set of data items into a "stream" of calls to an on-demand code execution environment, even when some data items from the set are modified during that transformation.

In some instances, a user may wish to both process existing data items within a data source and to continue to process data items in the data source as they are added (thus creating a "stream" of input from the data source). However, it may be undesirable to process all items in the data store sequentially, such that newly added data items are processed only after processing for all existing data items has completed. This may be especially undesirable with respect to data stores holding thousands or millions of pre-existing items, such that processing all pre-existing items would take a relatively long period of time (e.g., hours, days, weeks, etc.). Accordingly, the present disclosure may enable a data source to simultaneously be viewed as both a "backlog" of pre-existing data items, as well as a stream of "new" data items. Further, embodiments of the present disclosure may process both "new" and "backlogged" data items simultaneously, enabling real-time (or substantially real-time) processing of new data items while still enabling backlogged data items to eventually be processed.

To enable simultaneous processing of both new and backlogged data items, embodiments of the present disclosure may establish a demarcation point, which establishes one or more criteria designating some data items within a data source as "backlogged" and others as "new." The demarcation point may be a point in time, such that data items created or modified prior to the point in time are considered backlogged, while data items created or modified after (or potentially at) the point in time are considered new. In some instances, the task generation system may establish a demarcation point based on when processing of a data source begins (e.g., such that any data item created or modified after processing has begun would be considered a new data item). However, in other instances, it may be desirable to consider at least some pre-existing data items within a data source as "new" for the purposes of processing a data source. Illustratively, if the on-demand task execution environment is able to process data items at a higher rate than data items are added to the data source, designating some pre-existing data items as "new" may not significantly affect the ability of the environment to rapidly process later-added data items. Further, where such pre-existing data items were recently added to the data source, it may be desirable to process those data items rapidly, because users may be more likely to execute newly introduced functionality (e.g., corresponding to tasks executed on the on-demand code execution environment) with respect to recently submitted items than with respect to older data items. Accordingly, embodiments of the present disclosure may establish a demarcation time to include at least some pre-existing data items within a data source. Illustratively, the demarcation time may be established such that processing of "new" data items (e.g., on or after the demarcation time) "catches up" to creation of data items on the data source within a threshold period after processing begins (e.g., such that after "catching up," newly added or modified data items may be processed immediately). This threshold period may be established, for example, by an operator of the task generation system, or within one or more processing criteria submitted by a user. For example, a user may request that a demarcation time be established such that processing of data items after the demarcation time "catches up" to newly added or modified data items within a relatively short period, such as five to ten minutes. Illustratively, the task generation system may retrieve historical information from a data source to determine an estimate rate that data items are created or modified within the data source, and utilize that estimated rate to determine how quickly the task processing system may catch up to newly added data items, and thus, how long in the past the demarcation time can be set.

In some embodiments, the task generation system may process "new" data items (e.g., after a demarcation point) in a different manner than "backlogged" data items. For example, "new" data items may be processed immediately, while "backlogged" data items may be processed at a slower rate, or at a rate that varies based on the processing rate for "new" data items. In some instances, the speed at which "backlogged" data items are processed may vary based on the state of a data source, the task generation system, or the on-demand code execution system (e.g., to utilize excess capacity within these systems, or ensure that the rate of data item retrieval, submission, or processing in those systems does not exceed a threshold value). For example, the task generation system may vary a speed at which "backlogged" data items are processed according to a rate at which new tasks occur at the on-demand code execution environment, regardless of whether the tasks are galled by the task generation system or due to some other cause. As a further example, "new" data items may be processed in chronological order, while "backlogged" data items may be processed according to an alternative ordering (e.g., reverse chronological order). Processing for "new" data items and "backlogged" data items may occur concurrently, such that a data source can be viewed by the task generation system as both a dynamic stream of data items and a static source of backlogged data items.

While examples are provided herein with respect to a single demarcation time, embodiments of the present disclosure may enable the use of multiple demarcation times, such as times dividing data items within a data source into "new," "backlogged," and "archived" data items. Some or all of such demarcation times may be specified manually by a user of the task generation system. Additionally or alternatively, some or all of such demarcation times may be automatically determined by the task generation system. For example, as described above, a demarcation time between "new" and "backlogged" data items may be established to cause the task generation system to "catch up" to newly added data items within a threshold period. Similarly, a demarcation time between "backlogged" and "archived" data items may be established such that processing of the "backlogged" data items is expected to occur within a second threshold period (e.g., longer than the threshold for "new" data items). The task generation system may include any number of such demarcation times, dividing a data source into any number of data streams, which may be processed serially, in parallel, or by a combination of serial and parallel processing. Furthermore, in some instances, the task generation system may decline to process one or more sets of data within a data source (e.g., "archived" data items).

Data items may in some instances be processed by the on-demand code execution environment independently or "statelessly," without depending on the status of the on-demand code execution environment in processing other data items from the data source. However, in other instances, processing of a first data item within a data source may be dependent on processing a second data item. For example, where the on-demand code execution environment is utilized to generate collage images from larger images within the data source, a first task that generates a collage from thumbnail images may be dependent on a number of prior tasks resizing large images into thumbnail size. Moreover, processing of a given set of data items may be dependent on common information, such that the processing occurs more efficiently when conducted concurrently (e.g., on a common machine). For example, where a batch of data items is encrypted with a common encryption key, it may be more efficient to process each data item in the batch on a single virtual machine instance than it would be to divide processing of the batch among many virtual machine instances. Accordingly, aspects of the present disclosure can enable data items to be submitted to an on-demand code execution environment in an ordering determined based on dependency information. For example, where processing of a first data item is dependent on processing of a second data item, the first data item may be submitted to the on-demand code execution environment only after successful processing of the second data item, even if the first data item is retrieved from a data source prior to the second data item. As a further example, where a shared dependency exists to process multiple data items (e.g., a shared dependency on an encryption key or other information), the multiple data items may be submitted to the on-demand task execution environment as a batch, such that execution of the data items occurs efficiently.

The execution of tasks on the on-demand code execution environment will now be discussed. Specifically, to execute tasks, the on-demand code execution environment described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user, which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identify a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. patent application Ser. No. 14/502,648, entitled "PROGRAMMATIC EVENT DETECTION AND MESSAGE GENERATION FOR REQUESTS TO EXECUTE PROGRAM CODE" and filed Sep. 30, 2014 ("the '648 application), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulates hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

As will be appreciated by one skilled in the art, the embodiments described herein function to improve the functioning of computing devices by enabling existing data sets to be processed within an on-demand code execution environment. Thus, the embodiments described herein expand the benefits of such an on-demand code execution environment (e.g., scalability, flexibility, efficiency, etc.) to existing data sets. Moreover, embodiments of the present application address challenges that occur when attempting to process existing data sets, and particularly large existing data sets, within an on-demand code execution environment, including limitations on the speed at which data items can be read from the data set or processed at the on-demand code execution environment and the potential that data items within the data set are not associated with unique identifiers or are subject to change during processing. Thus, the embodiments described herein solve technical problems related to the limited speed at which computing devices can communicate and process large data sets. The embodiments described herein solve such technical problems by use of a technical solution, namely, the use of a task generation system that may transform data items from a data set into a corresponding "stream" of calls to an on-demand code execution environment, while maintaining information enabling the task generation system to ensure that each data item from the data set is processed at the on-demand code execution environment. Thus, one skilled in the art will appreciate by virtue of the present disclosure that the embodiments described herein represent a substantial contribution to the technical field of data processing and to computing devices in general.

The foregoing aspects and many of the attendant advantages of this disclosure will become more readily appreciated as the same become better understood by reference to the following detailed description, when taken in conjunction with the accompanying drawings.

FIG. 1 is a block diagram of an illustrative operating environment 100 in which a task generation system 170 may operate to read data items from a set of data items stored at a data source 160, and to submit corresponding calls to an on-demand code execution environment 110 to execute tasks based on those data items. Criteria for operation of the task generation system 170, including identification of the data source 160, data items within the data source 160, and tasks to execute at the on-demand code execution environment based on the data items, may be provided by a user utilizing a user computing device 102. By way of illustration, various example user computing devices 102 are shown in communication with the on-demand code execution environment 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The task generation system 170 may provide the user computing devices 102 with one or more user interfaces, command-line interfaces (CLI), application programing interfaces (API), and/or other programmatic interfaces for interacting with the task generation system 170 to specify one or more processing criteria for operation of the task generation system 170 and receive results of such operation. Further, the on-demand code execution environment 110 may provide the user computing devices 102 with one or more user interfaces, command-line interfaces (CLI), application programing interfaces (API), and/or other programmatic interfaces for generating and uploading user-executable code, invoking the user-provided code (e.g., submitting a request to execute the user codes on the on-demand code execution environment 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The data sources 160 can correspond to network-connected computing devices, such as servers, which generate data accessible to the one-demand code execution environment 110, the task generation system 170, or both. For example, the data sources 160 can include web services (e.g., associated with the user computing devices 102, with the on-demand code execution environment 110, or with third parties), databases, really simple syndication ("RSS") services or readers, social networking sites, or any other source of network-accessible service or data source. In some instances, data sources 160 actively transmit information, such as API calls or other task-triggering information, to the on-demand code execution environment 110 as that information is entered to the data source 160. In other instances, data sources 160 may be passive, such that data is made available for access by the on-demand code execution environment 110 as it is entered into the data source 160. As described below, components of the on-demand code execution environment 110 may periodically poll such passive data sources, and trigger execution of tasks within the on-demand code execution environment 110 based on the data provided. Further, an in accordance with embodiments of the present disclosure, the data sources 160 may include pre-existing data sets that are too large to simultaneously submit to the on-demand code execution environment for processing, and thus may be processed at the task generation system 170. While depicted in FIG. 1 as distinct from the user computing devices 102, the on-demand code execution environment 110, and the task generation system 170, in some embodiments, various data sources 160 may be implemented by the respective user computing devices 102, task generation system, or on-demand code execution environment 110.

The various elements of FIG. 1, including the user computing devices 102, data sources 160, task generation system 170, and -demand code execution environment 110, may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution environment 110 is depicted in FIG. 1 as operating in a distributed computing environment including several computer systems that are interconnected using one or more computer networks (not shown in FIG. 1). The on-demand code execution environment 110 could also operate within a computing environment having a fewer or greater number of devices than are illustrated in FIG. 1. Thus, the depiction of the on-demand code execution environment 110 in FIG. 1 should be taken as illustrative and not limiting to the present disclosure. For example, the on-demand code execution environment 110 or various constituents thereof could implement various Web services components, hosted or "cloud" computing environments, and/or peer to peer network configurations to implement at least a portion of the processes described herein.

Further, the on-demand code execution environment 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution environment 110 is illustrated as connected to the network 104. In some embodiments, any of the components within the on-demand code execution environment 110 can communicate with other components of the on-demand code execution environment 110 via the network 104. In other embodiments, not all components of the on-demand code execution environment 110 are capable of communicating with other components of the virtual environment 100. In one example, only the frontend 120 may be connected to the network 104, and other components of the on-demand code execution environment 110 may communicate with other components of the virtual environment 100 via the frontend 120.

In FIG. 1, users, by way of user computing devices 102, may interact with the on-demand code execution environment 110 to provide executable code, and establish rules or logic defining when and how such code should be executed on the on-demand code execution environment 110. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution environment 110, and request that the on-demand code execution environment 110 execute the code using one or more pre-established virtual machine instances. The on-demand code execution environment 110 can handle the acquisition and configuration of compute capacity (e.g., containers, instances, etc., which are described in greater detail below) based on the code execution request, and execute the code using the compute capacity. The on-demand code execution environment 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution environment 110, the environment 110 includes a frontend 120, which enables interaction with the on-demand code execution environment 110. In an illustrative embodiment, the frontend 120 serves as a "front door" to the other services provided by the on-demand code execution environment 110, enabling users (via user computing devices 102) to provide, request execution of, and view results of computer executable code. The frontend 120 can include a variety of components to enable interaction between the on-demand code execution environment 110 and other computing devices. For example, while not shown in FIG. 1, the frontend 120 can include a request interface, a job queue, a distribution manager, a polling interface, and an output interface. The request interface may provide user computing devices 102 with the ability to upload or otherwise communication user-specified code to the on-demand code execution environment 110, and to thereafter request execution of that code. In one embodiment, the request interfaces communicates with external computing devices (e.g., user computing devices 102, auxiliary services 106, etc.) via a graphical user interface (GUI), CLI, or API. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution environment 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution environment 110) prior to the request being received by the on-demand code execution environment 110. The on-demand code execution environment 110 may vary its execution strategy for a task based on where the code of the task is available at the time a call for the task is processed.

The request interface may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

A call to execute a task may specify one or more third-party libraries (including native libraries) to be used along with the user code corresponding to the task. In one embodiment, the call may provide to the on-demand code execution environment 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution environment 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution environment 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution environment 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution environment 110 may inspect the call and look for the flag or the header, and if it is present, the on-demand code execution environment 110 may modify the behavior (e.g., logging facilities) of the container in which the task is executed, and cause the output data to be provided back to the user. In some embodiments, the behavior/mode indicators are added to the call by the user interface provided to the user by the on-demand code execution environment 110. Other features such as source code profiling, remote debugging, etc. may also be enabled or disabled based on the indication provided in a call.

To manage requests for code execution, the frontend can further include an execution queue, which can maintain a record of user-requested task executions. Illustratively, the number of simultaneous task executions by the on-demand code execution environment 110 is limited, and as such, new task executions initiated at the on-demand code execution environment 110 (e.g., via an API call) may be placed on the execution queue and processed, e.g., in a first-in-first-out order. In some embodiments, the on-demand code execution environment 110 may include multiple execution queues, such as individual execution queues for each user account. For example, users of the on-demand code execution environment 110 may desire to limit the rate of task executions on the on-demand code execution environment 110 (e.g., for cost reasons). Thus, the on-demand code execution environment 110 may utilize an account-specific execution queue to throttle the rate of simultaneous task executions by a specific user account. In some instances, the on-demand code execution environment 110 may prioritize task executions, such that task executions of specific accounts or of specified priorities bypass or are prioritized within the execution queue. In other instances, the on-demand code execution environment 110 may execute tasks immediately or substantially immediately after receiving a call for that task, and thus, the execution queue may be omitted.

As noted above, tasks may be triggered for execution at the on-demand code execution environment 110 based on explicit calls from user computing devices 102 (e.g., as received at the request interface 120). Alternatively or additionally, tasks may be triggered for execution at the on-demand code execution environment 110 based on data retrieved from one or more data sources 160. To facilitate interaction with data sources 160, the frontend 120 can include a polling interface, which operates to poll data sources 160 for newly available data. Illustratively, the polling interface may periodically transmit a request to one or more user-specified data sources 160 to retrieve any newly available data (e.g., social network "posts," news articles, etc.), and to determine whether that data corresponds to a user-established criteria triggering execution a task on the on-demand code execution environment 110. Illustratively, criteria for execution of a task may include, but is not limited to, whether new data is available at the data sources 160, the type or content of the data, or timing information corresponding to the data.

In addition to tasks executed based on explicit user calls and data from data sources 160, the on-demand code execution environment 110 may in some instances operate to trigger execution of tasks independently. For example, the on-demand code execution environment 110 may operate (based on instructions from a user) to trigger execution of a task at each of a number of specified time intervals (e.g., every 10 minutes).

The frontend 120 can further include an output interface configured to output information regarding the execution of tasks on the on-demand code execution environment 110. Illustratively, the output interface may transmit data regarding task executions (e.g., results of a task, errors related to the task execution, or details of the task execution, such as total time required to complete the execution, total data processed via the execution, etc.) to the user computing devices 102, to data sources 160, or to billing or logging services (not shown in FIG. 1). The output interface may further enable transmission of data, such as service calls, to data sources 160. For example, the output interface may be utilized during execution of a task to transmit an API request to a data source 160 (e.g., to store data generated during execution of the task).

To execute tasks, the on-demand code execution environment 110 includes a warming pool manager 130, which "pre-warms" (e.g., initializes) virtual machine instances to enable tasks to be executed quickly, without the delay caused by initialization of the virtual machines. The on-demand code execution environment 110 further includes a worker manager 140, which manages active virtual machine instances (e.g., currently assigned to execute tasks in response to task calls).

The warming pool manager 130 ensures that virtual machine instances are ready to be used by the worker manager 140 when the on-demand code execution environment 110 detects an event triggering execution of a task on the on-demand code execution environment 110. In the example illustrated in FIG. 1, the warming pool manager 130 manages the warming pool 130A, which is a group (sometimes referred to as a pool) of pre-initialized and pre-configured virtual machine instances that may be used to execute tasks in response to triggering of those tasks. In some embodiments, the warming pool manager 130 causes virtual machine instances to be booted up on one or more physical computing machines within the on-demand code execution environment 110 and added to the warming pool 130A. For example, the warming pool manager 130 may cause additional instances to be added to the warming pool 130A based on the available capacity in the warming pool 130A to service incoming calls. In some embodiments, the warming pool manager 130 may utilize both physical computing devices within the on-demand code execution environment 110 and one or more virtual machine instance services to acquire and maintain compute capacity that can be used to service calls received by the frontend 120. Further, the on-demand code execution environment 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific call to execute a task. The predetermined set of configurations can correspond to various types of virtual machine instances to execute tasks. The warming pool manager 130 can optimize types and numbers of virtual machine instances in the warming pool 130A based on one or more metrics related to current or previous task executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's calls. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution environment 110, the user interface may prompt the user to specify one of the predetermined operating conditions for executing the task. In another example, the service-level agreement (SLA) for utilizing the services provided by the on-demand code execution environment 110 may specify a set of conditions (e.g., programming languages, computing resources, etc.) that tasks should satisfy, and the on-demand code execution environment 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pool 130A are usable by which user), among other specified conditions.

The worker manager 140 manages the instances used for servicing incoming calls to execute tasks. In the example illustrated in FIG. 1, the worker manager 140 manages the active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution environment 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, tasks are executed in isolated on-demand code execution environments referred to as containers (e.g., containers 156D, 156E, 158D). Containers are logical units created within a virtual machine instance using the resources available on that instance. For example, the worker manager 140 may, based on information specified in a call to execute a task, create a new container or locate an existing container in one of the instances in the active pool 140A and assigns the container to the call to handle the execution of the task. In one embodiment, such containers are implemented as Linux containers.

Once a triggering event to execute a task has been successfully processed by the frontend 120, the worker manager 140 finds capacity to execute a task on the on-demand code execution environment 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution environment 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution environment 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution environment 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution environment 110 may maintain a separate cache in which code of tasks are stored to serve as an intermediate level of caching system between the local cache of the virtual machine instances and a web-based network storage (e.g., not shown in FIG. 1). The various scenarios that the worker manager 140 may encounter in servicing the call are described in greater detail within the '648 application, incorporated by reference above (e.g., at FIG. 4 of the '648 application).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution environment 110 may provide data to one or more of the auxiliary services (not shown in FIG. 1) as it executes tasks in response to triggering events. For example, the frontend 120 may communicate with monitoring/logging/billing services. The monitoring/logging/billing services may include: a monitoring service for managing monitoring information received from the on-demand code execution environment 110, such as statuses of containers and instances on the on-demand code execution environment 110; a logging service for managing logging information received from the on-demand code execution environment 110, such as activities performed by containers and instances on the on-demand code execution environment 110; and a billing service for generating billing information associated with executing user code on the on-demand code execution environment 110 (e.g., based on the monitoring information and/or the logging information managed by the monitoring service and the logging service). In addition to the system-level activities that may be performed by the monitoring/logging/billing services (e.g., on behalf of the on-demand code execution environment 110), the monitoring/logging/billing services may provide application-level services on behalf of the tasks executed on the on-demand code execution environment 110. For example, the monitoring/logging/billing services may monitor and/or log various inputs, outputs, or other data and parameters on behalf of the tasks being executed on the on-demand code execution environment 110.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The worker manager 140 may include an instance allocation unit for finding compute capacity (e.g., containers) to service incoming code execution requests and a user code execution unit for facilitating the execution of user codes on those containers. An example configuration of the worker manager 140 is described in greater detail within the '648 application, incorporated by reference above (e.g., within FIG. 2 of the '648 application). Illustratively, the instance allocation unit may interact with a dynamically allocated network storage service (not shown in FIG. 1) to increase the amount of data storage available to virtual machine instances.

In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the on-demand code execution environment 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the on-demand code execution environment 110 may comprise multiple frontends, multiple warming pool managers, and/or multiple worker managers. Although four virtual machine instances are shown in the example of FIG. 1, the embodiments described herein are not limited as such, and one skilled in the art will appreciate that the on-demand code execution environment 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the on-demand code execution environment 110 may comprise any number of warming pools and active pools.

While not shown in FIG. 1, in some embodiments, the on-demand code execution environment 110 may include multiple frontends 120. In such embodiments, a load balancer may be provided to distribute the incoming calls to the multiple frontends 120, for example, in a round-robin fashion. In some embodiments, the manner in which the load balancer distributes incoming calls to the multiple frontends 120 may be based on the state of the warming pool 130A and/or the active pool 140A. For example, if the capacity in the warming pool 130A is deemed to be sufficient, the calls may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the calls may be distributed to the multiple frontends 120 in a manner that reduces or minimizes the number of virtual machine instances taken from the warming pool 130A. For example, even if, according to a load balancing restriction, a call is to be routed to Frontend A, if Frontend A needs to take an instance out of the warming pool 130A to service the call but Frontend B can use one of the instances in its active pool to service the same call, the call may be routed to Frontend B.

In accordance with embodiments of the present disclosure, operating environment 100 of FIG. 1 further includes a task generation system 170 configured to utilize a pre-existing set of data items within one or more data sources 160 to generate a stream of task execution calls to the on-demand code execution environment. As shown in FIG. 1, the task generation system 170 includes a user interface 171, a data inspector 172, a call generator 174, an in-process cache 176, and a results cache 178, each of which is described in more detail below. The illustration of the various components within the task generation system 170 is logical in nature and one or more of the components can be implemented by a single computing device or multiple computing devices. For example, each of the user interface 171, data inspector 172, call generator 174, in-process cache 176, and results cache 178 can be implemented on multiple physical computing devices in different various geographic regions, which computing devices may operate collectively to implement a single instance of the respective user interface 171, data inspector 172, call generator 174, in-process cache 176, or results cache 178, or operate independently to implement distinct instances of the user interface 171, data inspector 172, call generator 174, in-process cache 176, or results cache 178. Moreover, while the task generation system 170 is illustratively depicted in FIG. 1 as distinct from the on-demand code execution environment 110, the task generation system 170 may in some instances be integrated with the on-demand code execution environment 110 as a single (potentially distributed) system.

The user interface 171 of the task generation system 170 provides one or more interfaces (e.g., including GUIs, CLIs, APIs, etc.) through which user, using user computing devices 102, may instruct the task generation system 170 to utilize data items within a data source 160 to generate calls to the on-demand code execution environment 110. The user interface 171 can illustratively enable a user computing device 102 to submit one or more processing criteria regarding operation of the task generation system 170, including, for example, one or more data sources 160 from which to access data items, the specific data items (e.g., forming a set of data items) to use to generate corresponding calls to the on-demand code execution environment 110, parameters for accessing the data sources 160 (e.g., speed of access, protocol, credentials, etc.), tasks on the on-demand code execution environment 110 to call based on the data items within the data source 160, parameters for calling for execution of tasks on the on-demand code execution environment 110 (e.g., frequency of task call, mechanism for making task calls, credentials, etc.), processes for handling modifications to data items or errors that occur during processing, and processes for reporting results of the processing.

After receiving a request from a user computing device 102 to generate calls to the on-demand code execution environment 120 based on data items within a data source 160, the task generation system 170 can utilize a data inspector 172 to access data items within the data source 160, ensure that the data items have not previously been processed by the task generation system 170, and enqueue the data item for use in generating a task call to the on-demand code execution environment. Illustratively, data items may be enqueued within the in-process cache 176, which may maintain a listing of data items read by the data inspector 172 but for which a corresponding task at the on-demand code execution environment 110 has not yet successfully completed.

The task generation system 170 can further utilize a call generator 174, which may read data items from the in-process cache 176, and generate a call to the on-demand code execution environment 110 for each data item from the in-process cache 176. The call generator 174 may further interact with the on-demand code execution environment 110 to determine the results of a call corresponding to a data item, and to record that result in the results cache 178. In some instances, the call generator 174 may be configured to determine when a call to the on-demand code execution environment 110 fails with respect to a data item, and either resubmit the call, return that data item to the in-process cache 176, or record an error in the results cache 178 with respect to the data item.

While the in-process cache 176 and the results cache 178 are shown in FIG. 1 as elements of the task generation system 170, in some instances these caches may be physically distinct from the task generation system 170. For example, where the task generation system 170 has the ability to write data to a data source 160, the in-process cache 176 and/or the results cache 178 may be implemented on the data source 160, and thus omitted from physical inclusion within the task generation system 170.

The various elements of the task generation system 170 may operate serially (e.g., in temporal order according to the description above), or may operate at least partially in parallel. For example, the data inspector 172 (or multiple instances of the data inspector 172) may read data items from a data source 160 continuously, while enqueuing those data items in the in-process cache 176. At the same time, the call generator 174 (or multiple instances of the call generator 176) may operate to dequeue data items from the in-process cache 176 and submit a task call corresponding to the data item to the on-demand code execution environment 110. The data inspector 172 and call generator 174 may continue to operate in this manner until no unread data items are seen at the data source 160, at which point the user interface 171 may report to a user computing device 102 that processing of the data source 160 is complete (e.g., along with results of the processing, as stored in the results cache 178).

Figure 2:
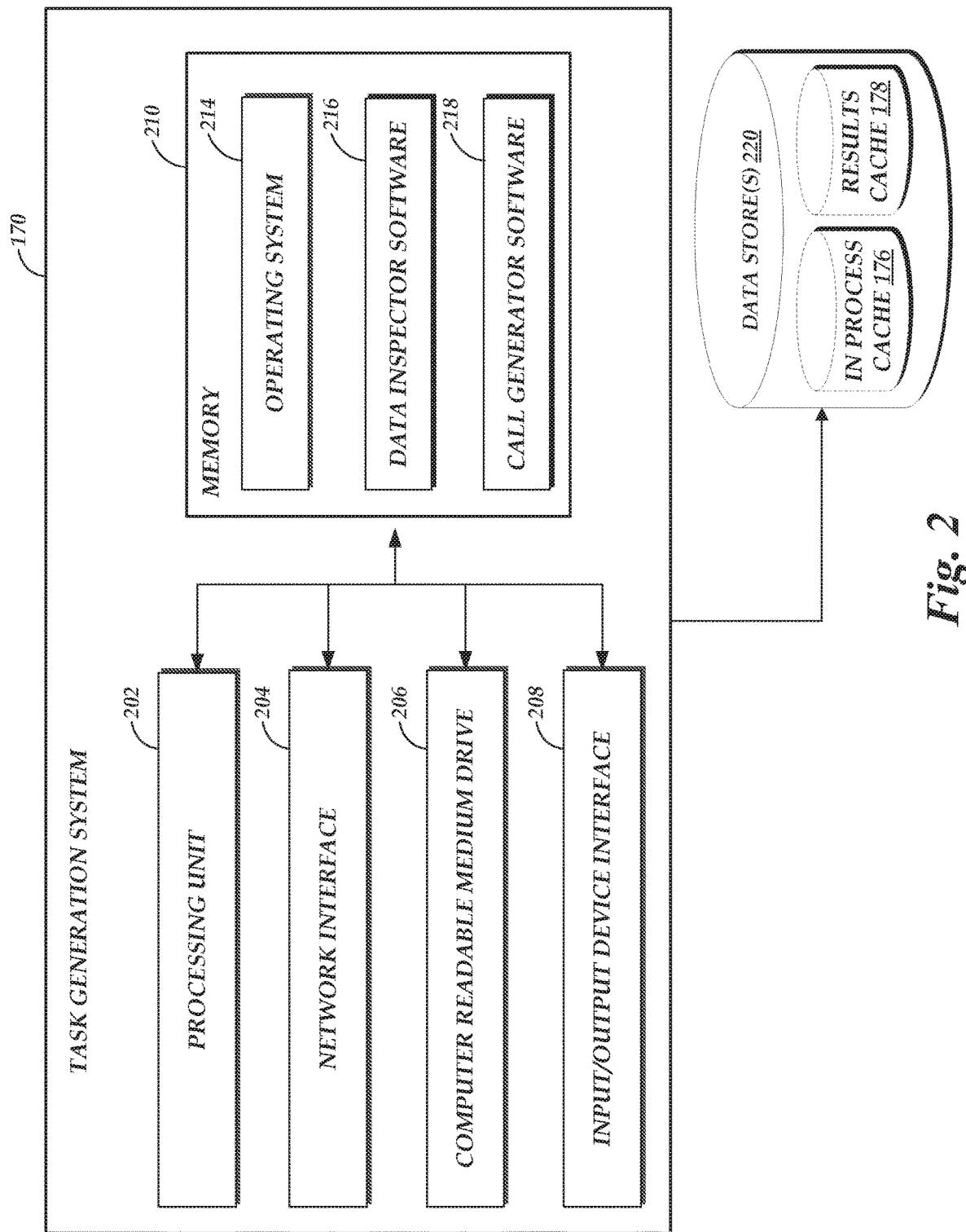
FIG. 2 depicts a general architecture of a computing device providing the task generation system.

FIG. 2 depicts a general architecture of a computing system that may implement the task generation system 170. The general architecture of the task generation system 170 depicted in FIG. 2 includes an arrangement of computer hardware and software modules that may be used to implement aspects of the present disclosure. The hardware modules may be implemented with physical electronic devices, as discussed in greater detail below. The task generation system 170 may include many more (or fewer) elements than those shown in FIG. 2. As illustrated, task generation system 170 includes a processing unit 202, a network interface 204, a computer readable medium drive 206, and an input/output device interface 208, all of which may communicate with one another by way of a communication bus. The network interface 204 may provide connectivity to one or more networks or computing systems. The processing unit 200 may thus receive information and instructions from other computing systems or services via the network 104. The processing unit 200 may also communicate to and from memory 210 and further provide output information for an optional display (not shown) via the input/output device interface 208. The input/output device interface 208 may also accept input from an optional input device (not shown). Additionally, the processing unit 200 may communicate with one or more data stores 220, which may correspond to any persistent or substantially persistent data storage, such as a hard drive (HDD), a solid state drive (SDD), network attached storage (NAS), a tape drive, or any combination thereof. Illustratively, the data stores 220 may be utilized to implement the in-process cache 176 and results cache 178.

The memory 210 may contain computer program instructions (grouped as modules in some embodiments) that the processing unit 202 executes in order to implement one or more aspects of the present disclosure. The memory 210 generally includes RAM, ROM and/or other persistent, auxiliary or non-transitory computer readable media. The memory 210 may store an operating system 214 that provides computer program instructions for use by the processing unit 200 in the general administration and operation of the task generation system 170. The memory 210 may further include computer program instructions and other information for implementing aspects of the present disclosure. For example, in one embodiment, the memory 210 includes data inspector software 186 that corresponds to computer-executable instructions that, when executed by the task generation system 170, implement the functions described above with respect to the data inspector 172, as well as call generator software 218 that, when executed by the task generation system 170, implement the functions described above with respect to the call generator 174. While the data inspector software 216 and call generator software 218 is shown in FIG. 2 as part of the task generation system 170, in other embodiments, all or a portion of the data inspector 172 and the call generator 174 may be implemented by other components of the on-demand code execution environment 110 and/or another computing device. For example, in certain embodiments of the present disclosure, another computing device in communication with the on-demand code execution environment 110 may include several modules or components that operate similarly to the modules and components illustrated as part of the task generation system 170.

While the computing device of FIG. 2 is described as implementing the task generation system 170, the same or a similar computing device may additionally or alternatively be utilized to implement other components of FIG. 1, including components of the on-demand code execution environment 110. For example, such a computing device may be utilized, independently or in conjunction with other components (e.g., data stores) to implement the warming pool manager 130 or worker manager 140 of FIG. 1. The software or computer-executable instructions placed within the memory 180 may be modified to enable execution of the functions described herein with respect to the warming pool manager 130 or worker manager 140.

Figure 3:
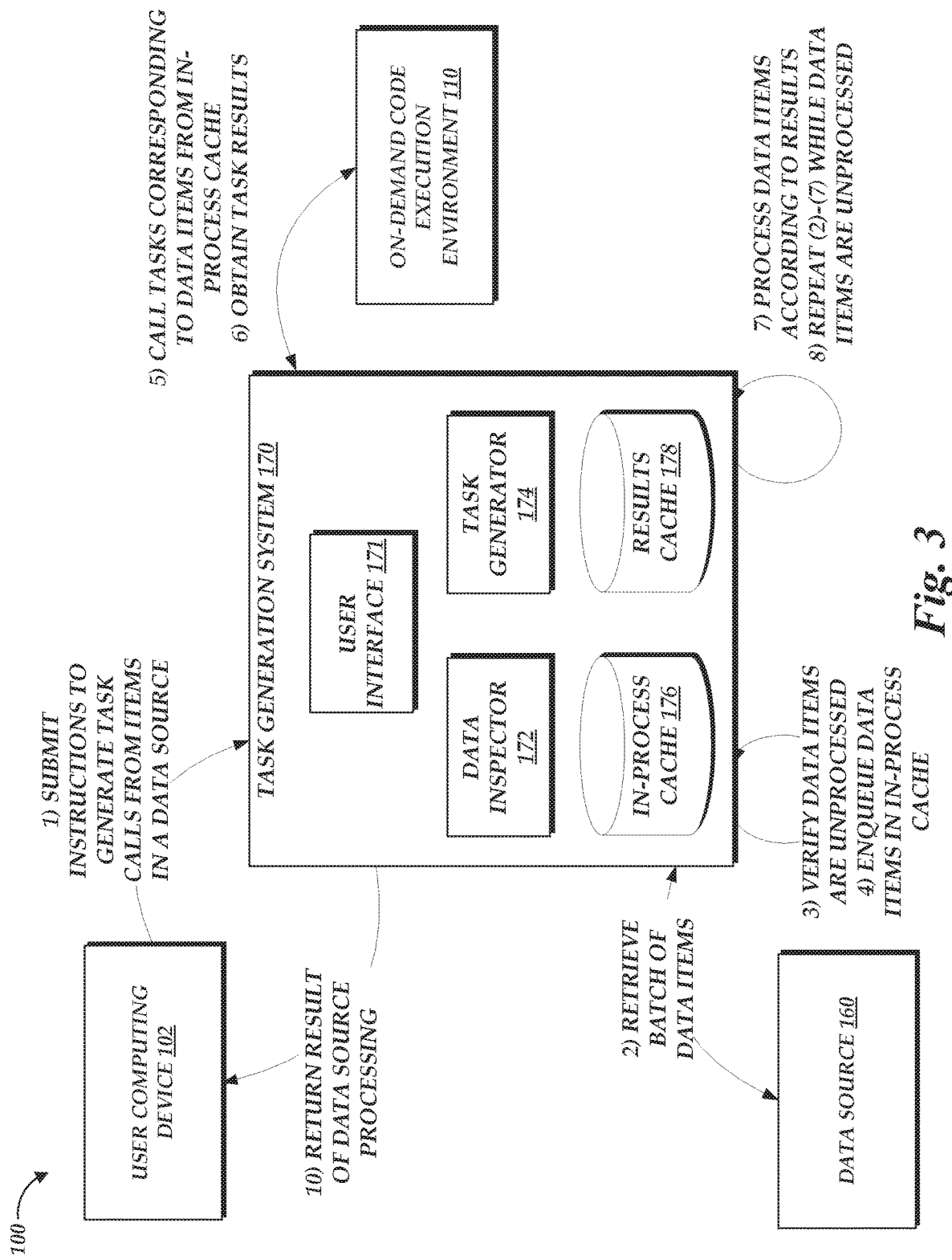
FIG. 3 is a flow diagram depicting illustrative interactions for utilizing data within a data source to generate requests to an on-demand code execution environment.

With reference to FIG. 3, illustrative interactions are depicted for utilizing data within one or more data sources 160 to generate corresponding task calls to the on-demand code execution environment 110. The interactions of FIG. 3 begin at (1), where a user computing device 102 transmits instructions to the task generation system 170 (e.g., via the user interface 171) to generate task calls to the on-demand code execution environment 110 based on data items within a data source 160. As noted above, the user computing device 102 may provide one or more criteria regarding operation of the task generation system 170 that, by way of non-limiting example, may include one or more data sources 160 from which to access data items, the specific data items (e.g., forming a set of data items) to use to generate corresponding calls to the on-demand code execution environment 110, parameters for accessing the data sources 160 (e.g., speed of access, protocol, credentials, etc.), tasks on the on-demand code execution environment 110 to call based on the data items within the data source 160, parameters for calling for execution of tasks on the on-demand code execution environment 110 (e.g., frequency of task call, mechanism for making task calls, credentials, etc.), processes for handling modifications to data items or errors that occur during processing, and processes for reporting results of the processing. While the one or more criteria provided by a user computing device 102 may identify any number of distinct data sources 106 (e.g., logically different collections of data, such as different databases, services, physical servers, etc.), FIG. 3 will be described with respect to processing of data items from a single data source 160.

Thereafter, at (2), the task generation system 170 (e.g., via the data inspector 172) can begin to retrieve the relevant data items from the data source 160 specified by the user computing device 102. While data items may be retrieved from multiple data sources, the interactions of FIG. 3 will be described with respect to a single data source, for simplicity. As noted above, some benefits of the task generation system 170 may be realized primarily when the number of relevant data items within the data source 160 is too large to permit simultaneous task calls for each data item to be made to the on-demand code execution environment 110. Thus, the task generation system 170 may retrieve data items from the data source 160 in sets or batches. Each batch may include one or more data items within the data source 160, identified based on one or more criteria provided by the user computing device 102 (e.g., data items associated with an account on the data source corresponding to the user computing device 102). The specific data items within a batch may vary according to the abilities of the data source 160. For example, where the data source 160 permits access according to attributes of the data items, the task generation system 170 may determine an attribute that designates a subset of all relevant data items, and request that those data items be returned to the task generation system 170. Illustratively, where the user computing device 102 has requested that a task on the on-demand code execution environment 110 be completed for all data items created between Jan. 1, 2000 and Jan. 1, 2015, the task generation system 170 may retrieve data items from the data source according to their month of creation (e.g., with each batch containing data items created during a given month within the relevant time period). As a further illustration, where the user computing device 102 has requested that a task on the on-demand code execution environment 110 be completed for data items with identifiers in a specific range, the task generation system 170 may retrieve data items from the data source according to their identifiers, with each batch including a subset of data items in the specified range of identifiers. In instances where the data source 160 does not permit access according to attributes of the data items, or where those attributes are not known, the task generation system 170 may attempt to retrieve batches of data items according to any criteria available at the data source 160. For example, the task generation system 170 may attempt to retrieve data items according to an ordering imposed by the data source (e.g., data items 1-100, 101-200, etc.), or randomly. In some instances, the task generation system 170 may attempt to control the number of data items, e.g., to reduce the computing resources required at the task generation system 170, the data source 160, or on the network 104. In one embodiment, an expected number of data items within a batch may be specified by the user computing device 102. In another embodiment, an expected number of data items within a batch may be automatically determined by the task generation system 170, such that computing resources required on the task generation system 170, the data source 160, or the network 104 fall under a threshold limit, and such that errors (e.g., due to timeouts of requests) are reduced or minimized. The expected number of data items within a batch may be varied during operation of the task generation system 170 to maintain computing resource usage under a threshold level while minimizing error rates.

Thereafter, at (3), the task generation system 170 (e.g., via the data inspector) verifies that the retrieved data items have not yet been processed or are not in-process at the task generation system 170. Illustratively, the task generation system 170 may compare an identifier of each data item to a set of identifiers within the in-process cache 176 and the results cache 178 to determine whether the data item is currently being or has previously been processed at the task generation system 170. If the data item has not been and is not being processed, the task generation system 170 may, at (4), enqueue the data item into the in-process cache 176 for later use in generating a task call to the on-demand code execution environment 110. Identifiers for data items may be obtained in whole or in part from the data source 160, for example, by retrieving a primary database key assigned to the data item at the data source 160. Additionally or alternatively, identifiers for data items may be generated by the task generation system 170, for example, by combining attributes of the data item or by processing information regarding the data item (or the entirety of the data item) according to a hash function.

Thereafter, at (5), the task generation system 170 (e.g., utilizing the call generator 174) may submit a task call to the on-demand code execution environment 110 for each data item within the in-process cache 176. The parameters of the task call may be specified at least in part by the one or more criteria provided by the user computing device 102. In one embodiment, the user computing device 102 may specify the entirety of the task call. For example, the user computing device 102 may specify a particular HTTP request to make, with a portion of the HTTP request varying based on the data item used to generate the task call. In another embodiment, the user computing device 102 may simply specify a particular task on the on-demand code execution environment 110 to call based on a data item, and further specify that the data item should be passed to the task for processing. In some embodiments, the particular task called in response to a data item may vary based on the data item itself. For example, the user computing device 102 may specify that for data items meeting a first set of criteria, a first task should be called, and that for data items meeting a second set of criteria, a second task should be called. As a further example, the user computing device 102 may vary the task called with respect to a data item based on whether that data item has been modified at the data source 160 since the task generation system 170 began retrieving data items from the data source 160. For example, where a data item is retrieved that shares some attributes with a previously retrieved data item (e.g., a database key), but does not share the same unique identifier (e.g., generated by hashing data of the data item), the user computing device 102 may request that the data item be used to call a distinct task on the on-demand code execution environment, such as a task that processes the new data item while also overwriting or deprecating results of a prior task called based on a prior version of the data item. Thus, the parameters of task calls made based on data items may be customized according to the needs of a user. In some instances, the task generation system 170 may modify an entry for the data item within the in-process cache 176 to indicate that a task call for the data item has been made to the on-demand code execution environment 110, but that the task call has not yet completed. Such modification may be advantageous, for example, where the task generation system 170 utilizes multiple instances of the call generator 174, to avoid different instances of the call generator 174 from submitting redundant task calls to the on-demand code execution environment 110.

At (6), the task generation system may obtain results from task calls made to the on-demand code execution environment 110 with respect to data items. The task generation system 170 can then further process the data items according to the results, at (7). In the instance that the task call completed successfully, the task generation system 170 can remove the data item from the in-process cache 176, and indicate the results of the task call within the results cache 178 (e.g., that the task call completed successfully, outputs of the task call, details regarding execution of tasks at the on-demand code execution environment 110, etc.). In the instance that the task call did not complete successfully, the task generation system 170 may either attempt to resubmit the task call to the on-demand code execution system 110 (e.g., where prior failures were caused by throttling or other temporary conditions at the on-demand code execution environment 110) or record a failure of the task call for the data item in the results cache 178. Where a high (e.g., over a threshold) number of task calls do not complete successfully, the task generation system 170 may in some instances modify the rate at which task calls are submitted in order to reduce or eliminate unsuccessful calls.

Thereafter, interactions (2)-(7), as described above, may be repeated until task calls for all relevant data items within the data source 160 have been completed. In one embodiment, the data source 160 may be configured such that the task generation system 170 can accurately determine when all relevant data items at the data source 160 (e.g., including data items modified since initiation of the interactions) have been processed, and thus, the interactions may end at that point. In another embodiment, the task generation system 170 may continue to retrieve items from the data source 160 until no new data items (e.g., with new unique identifiers) are seen at the task generation system 170. In yet another embodiment, the task generation system 170 may continue to retrieve data items from the data source 160 for a period (e.g., specified in absolute time, number of data items, number of batches, etc.) after no new data items are seen, to ensure that the presence of new data items at the data source 160 is unlikely. Thereafter, results of processing the data source can be returned to the user computing device 102.

While the interactions of FIG. 3 are described sequentially, one or more of the interactions may occur simultaneously. For example, interactions (2)-(4) may be repeatedly performed by the data inspector 172, while interactions (5)-(7) are simultaneously and repeatedly performed by the call generator 174. Moreover, the task generation system 170 may in some embodiments utilize multiple instances of either or both the data inspector 172 or call generator 174, and thus, any of interactions (2)-(7) may be performed multiple times concurrently. Accordingly, any temporal association of the interactions described above should be viewed as illustrative and not limiting with respect to the present disclosure.

In some instances, it may be desirable for different elements within the task generation system 170 to interact to control the speed at which data items are retrieved from the data source 160, tasks are called at the on-demand code execution environment 110, or both. Illustratively, where the data inspector 172 acts to retrieve data items from a data source 160 at a rate considerably higher than the rate at which the call generator 174 makes calls to the on-demand code execution environment 174, the number of data items in the in-process cache 176 may grow beyond a threshold limit. In such instances, the call generator 174 may increase the rate at which task calls are generated, the data inspector 172 may reduce the rate at which data items are retrieved from a data source 160, or both, to maintain a number of data items within the in-process cache 176 below the threshold limit. In addition, maximum rates of retrieval from the data source 160 or rates of task calls to the on-demand code execution environment 110 may be specified by the user computing device 102 as one or more criteria regarding operation of the task generation system 170.

While the interactions of FIG. 3 may involve transmission of data items themselves (e.g., to retrieve the data item from the data source 160, enqueue the data item in the in-process cache 176, submit the data item to the on-demand code execution environment 110, etc.), embodiments of the present disclosure may additionally or alternatively utilize references to data items, in place of the data item itself. For example, rather than retrieving the actual content of a data item from the data source 160, the task generation system 170 may instead retrieve a reference to the data item, along with any information required to implement the functionalities described above (e.g., attributes of the data item). Thereafter, rather than submitting a data item itself to the on-demand code execution environment 110, the task generation system 170 may pass a reference to the data item, such that the on-demand code execution environment 110 can thereafter interact with the data source 160 to retrieve relevant information pertaining to the data item. Similarly, while data items are described above as enqueued or stored within different elements of the task generation system 170 (e.g., the in-process cache 176 and the results cache 178), embodiments of the present disclosure may utilize pointers or other references to the data item (e.g., as stored within the data source 160 or in a general data store of the task generation system 176) to list the data item as logically included within these elements, thus reducing or eliminating a need to actually copy the data item between various elements.

As noted above, in some instances it may be desirable to view data items within a data source as both a "stream" of new data items and as a static (or relatively static) set of pre-existing data items, and to process such sets separately. Illustrative interactions for utilizing a data source to concurrently process such a stream of new data items and set of static data items will be described with reference to FIG. 4. More specifically, illustrative interactions will be described for establishing a demarcation time usable to different "new" data items (e.g., to be processed immediately as a data stream) from "backlogged" data items (e.g., to be processed separately as "static" data). For the purposes of description of FIG. 4, it will be assumed that a user computing device has previously submitted criteria to the task generation system 170 for processing a data source 160 (e.g., an identifier of the data source 160, credentials for accessing the data source 160, a task on the on-demand code execution environment 110 by which to process data items from the data source 160, etc.), and thus, interactions for receiving such criteria will not be re-described with respect to FIG. 4. The interactions of FIG. 4 therefore begin at (1), where the task generation system 170 retrieves time information for data items within the data source 160. Such time information may include, for example, times at which each data item (or a subset of data items) within the data source 160 was added or times at which each data item (or a subset of data items) was modified. Generally, the retrieved time information may include any information usable by the task generation system 170 to determine an estimated frequency of updates to the data source 160, which can then be utilized to establish a demarcation time for the data source 160. Accordingly, especially where the data source 160 holds a large number of data items, the task generation system 160 may retrieve time information for only a subset of recently created or modified data items (e.g., the top n most recently created or modified data items, data items created or modified in the last n minutes, hours, days, etc.). Thereafter, at (2), the task generation system 170 can process the retrieved time information to determine an estimated update frequency for the data source 160. Illustratively, the estimated update frequency may be determined by using time information for previously created or modified data items to extrapolate future times at which data items will be created or modified. For example, where data items have previously been added or modified in the data source 160 at an average of one data item per second, the task generation system may estimate the update frequency as one data item per second. In addition to simply averaging, many statistical techniques for using a series of data to extrapolate future values are known in the art, and may be applied to determine an update frequency from time information of previously stored data items.

Thereafter, at (3), the task generation system establishes a demarcation time for the data source 160. For the purposes of description with respect to FIG. 4, the task generation system 170 can utilize both the retrieved time information and the determined updated frequency to establish a demarcation time, such that submission of tasks to the on-demand code execution environment 110 is expected to "catch up" or synchronize with creation or modification of data items in the data source 160 within a threshold period of time. For example, the task generation system 170 may determine, for any given demarcation time, how many pre-existing data items in the data source 160 were added or modified after the demarcation time. The task generation system 170 may further determine, based on an anticipated rate of task processing at the on-demand code execution environment, when processing of those post-demarcation time data items would be expected to complete. Similarly, the task generation system 170 can determine how many new data items are excepted to be added to the data source 160 during processing of the those post-demarcation time data items, when processing of those new data items is expected to complete, etc., until the task generation system 170 determines an expected time at which new data items added into the data source 160 may be immediately processed (thus "catching up" or synchronizing the task generation system 170 with new modifications or additions at the data source 160). The task generation system 170 can then establish the demarcation time such that this expected synchronization time falls within a threshold value (e.g., five minutes, one hour, etc.). While establishment of a demarcation time based on an expected synchronization time is described with respect to FIG. 3, other embodiments of the task generation system 170 may establish demarcation times in other manners. For example, the task generation system 170 may establish a demarcation time as the time at which instructions were received from a user computing device 102 to process a data source 160.

Thereafter, at (4') and (4"), the task generation system 170 can retrieve both "new" data items (e.g., data items created or modified on or after the demarcation time) and "backlogged" data items (e.g., data items created or modified prior to the demarcation time) from the data source 170. Similarly, at (5') and (5"), the task generation system 170 can begin concurrently processing both new and backlogged data items by making calls to the on-demand code execution environment 110 corresponding to the respective new and backlogged data items. Thus, establishment of a demarcation time can enable a task generation system 170 to utilize a given data source 160 as two distinct sets of data.

Figure 4:
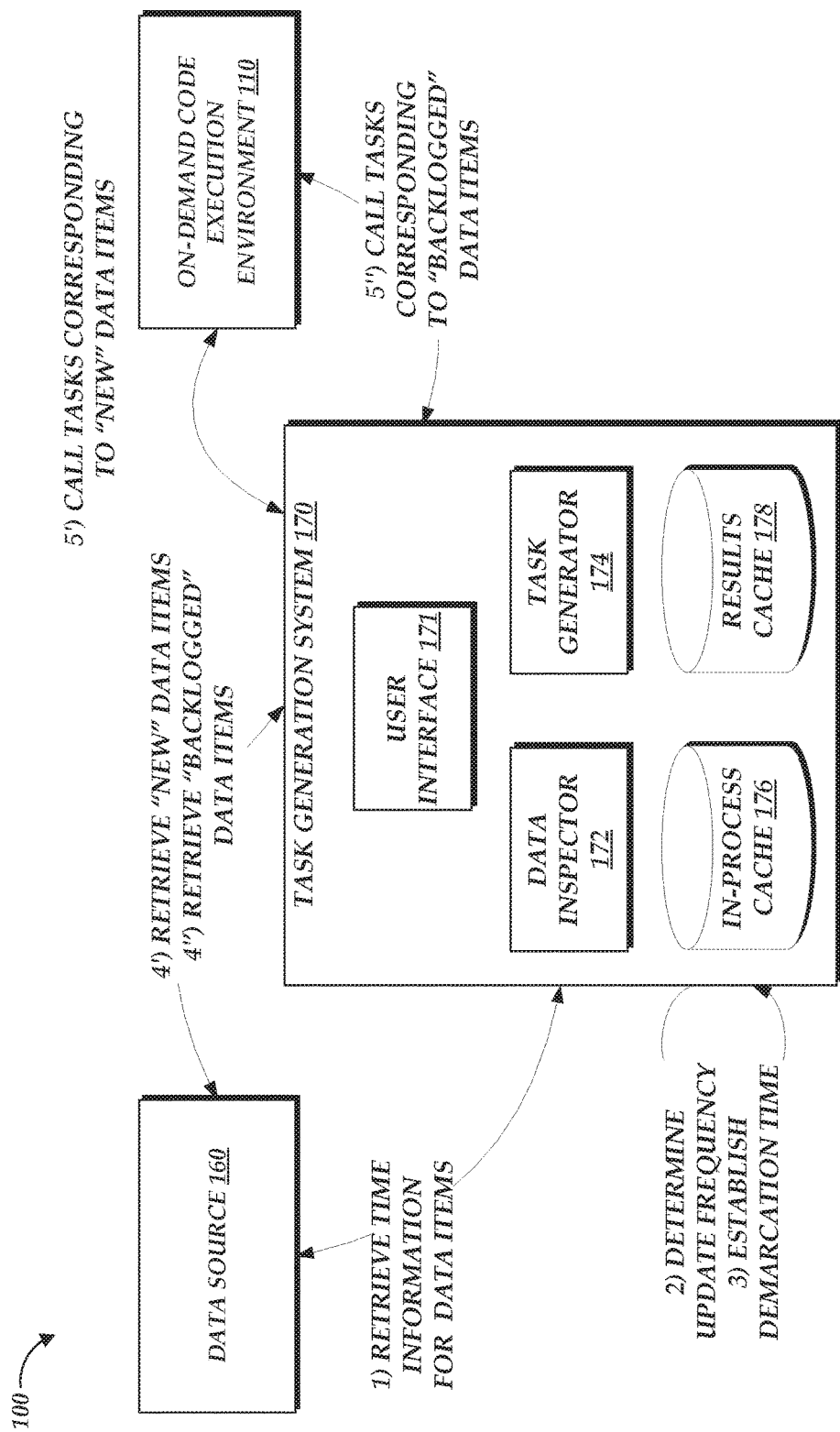
FIG. 4 is a flow diagram depicting illustrative interactions for processing data within a data source according to a demarcation time.

While not shown in FIG. 4, processing of either or both "new" or "backlogged" data items may occur according to the various embodiments described herein. For example, "new" or "backlogged" data items may be enqueued within the in-process cache 176 prior to a call to the on-demand code execution environment 110, subjected to verification by the task generation system 170 that the items are unprocessed, and enqueued into a results cache 178 after completion of a call (as described, e.g., with respect to FIG. 3, above). Moreover, the task generation system 170 may retrieve or process "new" and "backlogged" data items in different manners. For example, "new" data items may be retrieved and processed substantially immediately, such that calls to the on-demand code execution environment 110 occur as soon as practically possible after detection of the "new" data item. Conversely, "backlogged" data items may be retrieved and processed at a limited rate, to reduce the computing resources required to retrieve and process those data items. In one embodiment, the rate at which "backlogged" data items are retrieved or processed may be based at least partially on the estimated or actual rate at which "new" data items are retrieved and processed (e.g., in an inverse relationship). Further, while "new" data items may be retrieved and processed chronologically (e.g., in the order that they are created or modified on the data source 160), "backlogged" data items may be processed according to other orderings, such as in reverse chronological order. Thus, by dividing data items in a data source 160 according to a demarcation point, distinct sets of data items may be logically created, and each set may be processed independently.

Figure 5A:
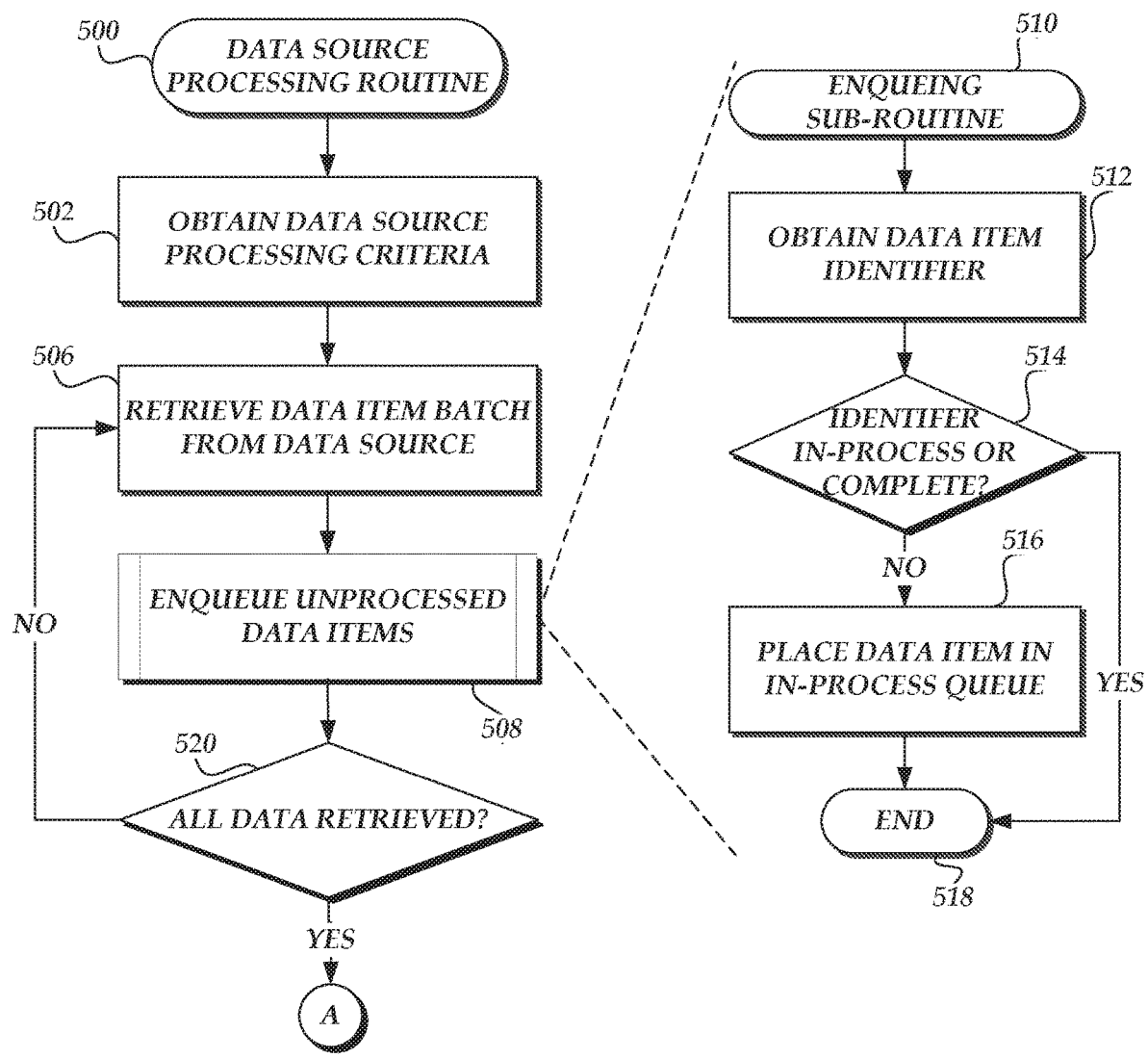
FIGS. 5A and 5B depict flow charts showing illustrative routines for utilizing data within a data store to generate a stream of task calls to an on-demand code execution environment.
Figure 5B:
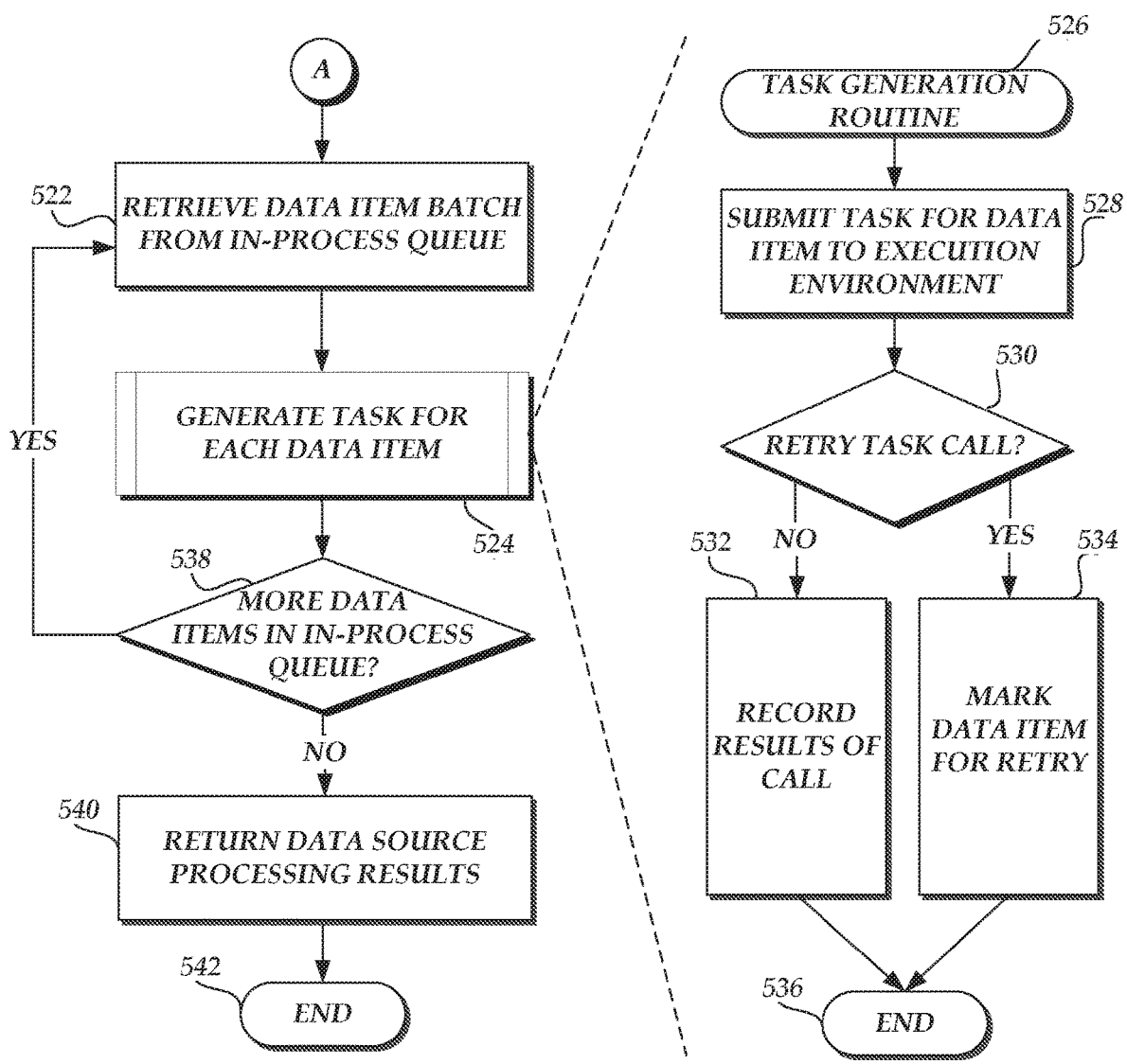

With reference to FIGS. 5A and 5B, flow charts showing an illustrative routine 500 for utilizing data within a data source to generate task calls to an on-demand code execution environment will be described. The routine 500 may be implemented, for example, by the task generation system 170. The routine 500 begins at block 502, where the task generation system 170 obtains one or more criteria for processing a data source in order to generate task calls to the on-demand code execution environment based on relevant data items within the data source. The criteria may be specified by a user utilizing a user computing device, and may include, by way of non-limiting example, one or more data sources 160 from which to access data items, the specific data items (e.g., forming a set of data items) to use to generate corresponding calls to the on-demand code execution environment 110, parameters for accessing the data sources 160 (e.g., speed of access, protocol, credentials, etc.), tasks on the on-demand code execution environment 110 to call based on the data items within the data source 160, parameters for calling for execution of tasks on the on-demand code execution environment 110 (e.g., frequency of task call, mechanism for making task calls, credentials, etc.), processes for handling modifications to data items or errors that occur during processing, and processes for reporting results of the processing.

Thereafter, at block 506, the task generation system 170 begins to retrieve data items from the data source, according to the criteria previously obtained. For the purposes of description, it will be assumed that data items are retrieved in "batches" of one more data items. However, data items may also be retrieved continuously (which may be described as retrieving "batches" of single data items at a constant rate). As discussed above, where the data source 160 enables retrieval of data items according to specific attributes, such as a unique identifier of the data item or a creation time of the data item, the task generation system 170 may specify those attributes to the data source 160, such that data items are retrieved at a preferred rate. The preferred rate may be specified by a user (e.g., as part of the obtained criteria), or may be automatically determined at the task generation system 170 (e.g., based on error rates in communicating with the data source 160, based on computing resources available at the task generation system 170, based on the number of data items included in the in-process data cache 176, etc.). Where the data source 160 does not enable retrieval of data items according to specific attributes, the task generation system 170 may request that n additional data items be provided in each batch, where n is indicated by the preferred rate.

At block 508, the task generation system 170 enqueues any unprocessed data items from within the retrieved set (e.g., data items not previously processed or currently being processed) in the in-process data cache 172. Enqueuing of an individual unprocessed data items is described in more detail with respect to sub-routine 510 of FIG. 5A. Sub-routine 510 begins at block 512, where an identifier for the data item is obtained 512. In one embodiment, the identifier may be obtained from the data source 160, for example, by retrieving a key corresponding to the data item used by the data source 160. Additionally or alternatively, an identifier may be obtained by combining or concatenating attributes of the data item to generate a unique identifier, or by passing the data item (e.g., including attributes of the data item) through a hash function to generate a unique identifier. Thereafter, at block 514, the task generation system 170 determines whether the identifier for the data item is currently being processed or has previously been processed at the task generation system 170. In one embodiment, the task generation system 170 (e.g., via the data inspector 172) may compare the identifier of the data item to a listing of identifiers within the in-process data cache 174 as well as a listing of identifiers in the results cache 176, to determine whether the identifier exists in either cache (and thus has either previously been processed or is in-process). If the result of the evaluation at block 514 is positive, the sub-routine 510 may end at block 518. If the result of the evaluation at block 514 is negative, the sub-routine 510 continues at block 516, where the data item is placed in a queue for generation of a corresponding call to the on-demand code execution environment 110. The queue may be maintained, for example, within the in-process data cache 174. The sub-routine 510 then ends at block 518.

After enqueing unprocessed data items at block 508, the routine 500 continues at block 520, where the task generation system 170 determines whether all relevant data items at the data source 160 have been retrieved by the task generation system 170. In some instances, the data source 160 may be configured such that the task generation system 170 can accurately determine when all relevant data items at the data source 160 (e.g., including data items modified since initiation of the interactions) have been processed, and thus, implementation of block 520 may include querying the data source as to whether any relevant data items have not yet been retrieved (and/or whether a previously retrieved data item has been modified since retrieval). In another embodiment, the task generation system 170 may continue to retrieve items from the data source 160 until no new data items (e.g., with new unique identifiers) are seen at the task generation system 170. Thus, implementation of block 520 may include determining whether any data items retrieved at a previously implementation of block 506 included unprocessed data items. In yet another embodiment, the task generation system 170 may continue to retrieve data items from the data source 160 for a period (e.g., specified in absolute time, number of data items, number of batches, etc.) after no new data items are seen, to ensure that the presence of new data items at the data source 160 is unlikely. Thus, implementation of block 520 may include determining that at least at least the period has elapsed without any new data items being retrieved. In the instance that the result of the evaluation at block 520 is negative, the routine 500 returns to block 506 and proceeds as described above. In the instance that the result of the evaluation at block 520 is positive, the routine 500 proceeds to through connector 'A' to blocks 522 through 542, which are shown on FIG. 5B.

As shown in FIG. 5B, the routine 500 continues through connector 'A' to block 522, where the task generation system 170 retrieves a batch of one or more data items from the in-process queue. Illustratively, such retrieval may include determining one or more identifiers for data items that are listed in the in-process queue, and modifying the listings for such data items to indicate that a task call to the on-demand code execution environment 110 is "in-flight" for the data item. The routine 500 then continues to block 225, where a task call for each data item retrieved from the in-process queue is generated at the task generation system 170. The process for generating task call for a data item is described in more detail within subroutine 526. Sub-routine 526 begins at block 528, where a call to a task corresponding to the data item is submitted to the on-demand code execution environment 110. Illustratively, the call may include an API call or HTTP packet formatted according to the parameters of the on-demand code execution environment 110 to specify a particular task (e.g., corresponding to a set of user-defined code requested to be executed at the on-demand code execution environment 110), as well as parameters to pass to the task. In one embodiment, the parameters may include the data item itself, or a reference to the data item (e.g., at the data source 160). In another embodiment, the parameters may include data derived from the data item (e.g., a portion of the data item, attributes of the data item, etc.). Because execution of a task can correspond to execution of any of a variety of user-specified code, implementation of block 528 may enable nearly any computer-implemented processing to occur with respect to the data item. For example, where the data item is a photograph, that photograph could be compressed or reformatted for use on a particular platform (e.g., as a 'thumbnail' image). As a further example, where the data item is a news posting, the posting could be analyzed for the occurrence of specific words or phrases, and the results of such analysis may be provided to a third party service. Many additional examples may be contemplated by one skilled in the art. After submitting a task call, the sub-routine 526 proceeds to block 530, where the task generation system 170 determines whether the task call should be retried. Illustratively, block 530 may evaluate positively where a task call completed successfully, or completed with an error occurred with respect to the task call that is not temporal in nature. For example, block 530 may evaluate positively where a task call resulted in either completion of the task without error or with an error related to the content of the data item. Conversely, block 530 may evaluate negatively when a task call results in a "time out" error, or an error indicating that task calls are being submitted to the on-demand code execution environment 110 at too high of a rate. In the instance block 530 is evaluated positively, the sub-routine 526 proceeds to block 534, where the task generation system 170 marks the data item used to generate the task call as a candidate for re-processing by retrying the task call. Illustratively, implementation of block 534 may include removing an "in-flight" indicator for the data item within the in-process queue, such that future implementations of block 522 may retrieve the data item from the in-process queue. Implementation of block 534 may further include appending other indicators to the data item within the in-process queue, such as a "delay" indicator indicating that a subsequent task call for the data item should only be generated after an appropriate delay (e.g., specified by an administrator of the task generation system 170, within criteria specified by a user, etc.). In the instance block 530 is evaluated negatively, the sub-routine 526 proceeds to block 532, where the task generation system 170 records the results of the call. Illustratively, the task generation system 170 may record a return indicator of the task call (e.g., that the call resulted in a successful execution of a task), as well as any data regarding execution of the task call (e.g., a result of the execution of the task). In one embodiment, the task generation system 170 may indicate that the task call executed successfully by recording an identifier of the data item used to generate the task call within the results cache 178. After implementation of either block 532 or block 534, the sub-routine 526 ends at block 536.

Returning to the routine 500, after implementation of block 524 (e.g., via implementation of sub-routine 526), the routine 500 continues at block 538, where the task generation system 170 determines whether any further data items exist in the in-process queue. If so, the routine 500 returns to block 522, and repeats until all data items have been utilized to generate task calls to the on-demand code execution environment 110 (e.g., and have resulted either in a successful completion of the task or an error that is not likely to be alleviated by retrying the task call). If no further data items exist in the in-process queue, the routine 500 proceeds to block 540, where results of the routine 500 are returned to the user at the user computing device 102. Illustratively, such results may be an indication that the data items within the data source have been processed, specific results with respect to individual data items (e.g., results of a task call generated for the data item, errors incurred with respect to the data item, etc.), or information pertaining to the overall processing of the data items (e.g., total time taken, number of requests to the on-demand code execution environment 110, etc.). The routine 500 can then end at block 542.

While the routine 500 is described above sequentially, the routine 500 may in some instances be implemented at least partially in parallel, either by an individual computing device or by multiple computing devices. For example, the loop shown with respect to blocks 506 through 520 may be repeated simultaneously with the loop shown with respect to blocks 522 through 538, such that data items continue to be retrieved from a data source while task calls for previously retrieved data items are generated at the task generation system 170. Moreover, multiple instances of the sub-routines 510 and 526 may be implemented concurrently by the same or different computing devices, such that multiple data items may be placed into an in-process queue (with respect to sub-routine 510) and multiple task calls may be generated from data items within that queue (with respect to sub-routine 526) simultaneously or contemporaneously. Moreover, the routine 500 may be altered based on the requirements of the task generation system 170, the on-demand code execution environment 110, or data sources 160. For example, the routine 500 may be modified to include additional blocks that provide for additional exchanges of information between the task generation system 170, the on-demand code execution environment 110, and data sources 160, such as negotiations as to the rate of data transmission. In some embodiments, one or more portions of the routine 500 may be carried out by other systems or devices, including systems or devices within the on-demand code execution environment 110.

Figure 6:
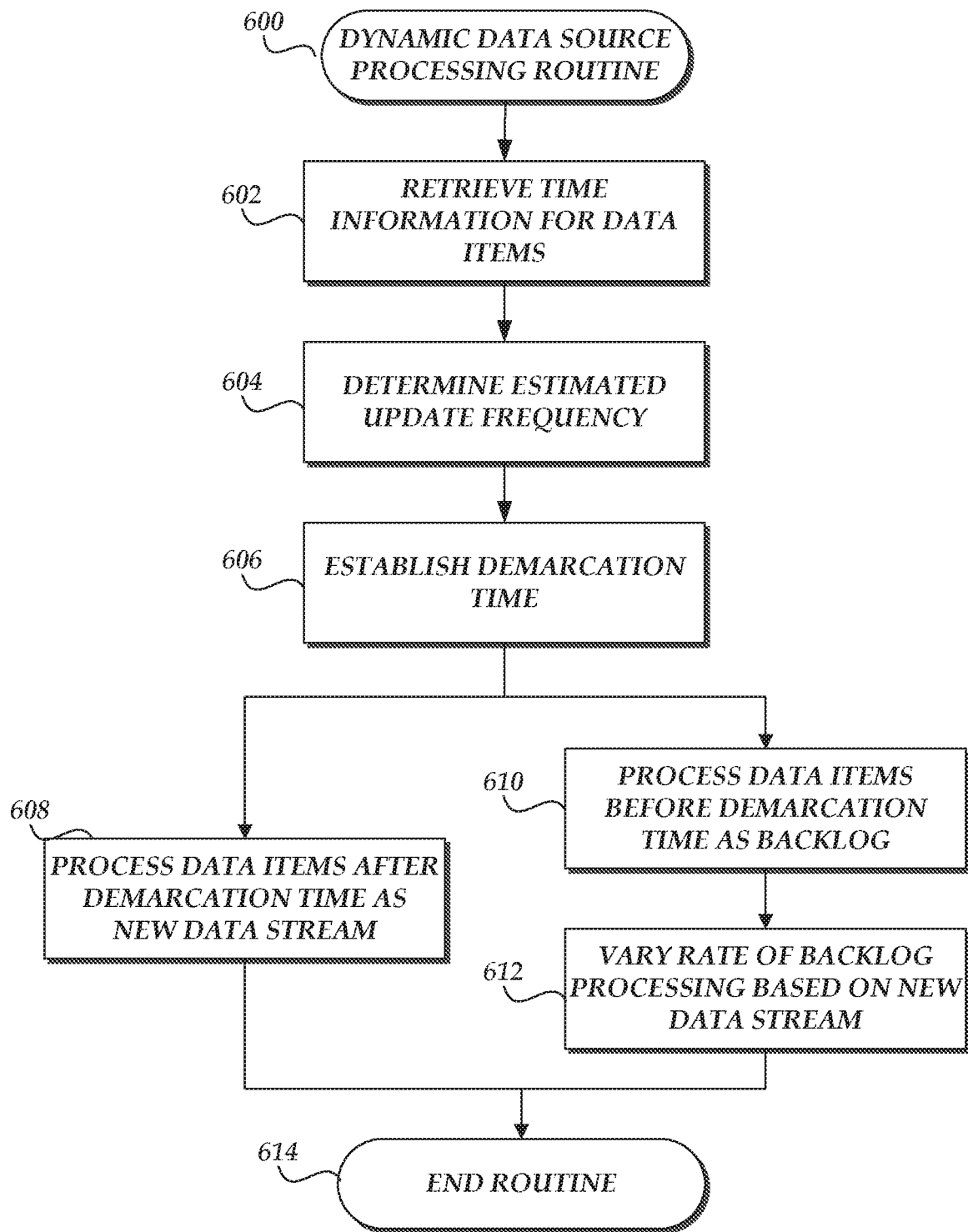
FIG. 6 depicts a flow chart showing an illustrative routine for utilizing a data source to concurrently process both new and backlogged data items, defined according to a demarcation point.

With reference to FIG. 6, a flow chart showing an illustrative routine 600 for utilizing a data source to concurrently process both new and backlogged data items, defined according to a demarcation point, will be described. The routine 600 may be implemented, for example, by the task generation system 170. For the purposes of description of FIG. 6, it will be assumed that a user computing device has previously submitted criteria to the task generation system 170 for processing a data source 160 (e.g., an identifier of the data source 160, credentials for accessing the data source 160, a task on the on-demand code execution environment 110 by which to process data items from the data source 160, etc.), and thus, receiving such criteria will not be re-described with respect to FIG. 6. The routine 600 of FIG. 6 therefore begins at block 602, where the task generation system 170 retrieves time information for one or more data items within a data source 160. Generally described, the retrieved time information may include any information usable by the task generation system 170 to determine an estimated frequency of updates to the data source 160, which can then be utilized to establish a demarcation time for the data source 160. Accordingly, the task generation system 160 may retrieve time information for the top n most recently created or modified data items, data items created or modified in the last n minutes, hours, days, etc. Thereafter, at block 604, the task generation system 170 processes the retrieved time information to determine an estimated update frequency for the data source 160. Illustratively, the estimated update frequency may be determined by using time information for previously created or modified data items to extrapolate future times at which data items will be created or modified. For example, where data items have previously been added or modified in the data source 160 at an average of one data item per second, the task generation system may estimate the update frequency as one data item per second. In addition to simply averaging, many statistical techniques for using a series of data to extrapolate future values are known in the art, and may be applied to determine an update frequency from time information of previously stored data items.

At block 606, the task generation system 170 establishes a demarcation time for the data source 160. Illustratively, the demarcation time can be set such that submission of tasks to the on-demand code execution environment 110 is expected to "catch up" or synchronize with creation or modification of data items in the data source 160 within a threshold period of time. For example, the task generation system 170 may determine, for any given demarcation time, how many pre-existing data items in the data source 160 were added or modified after the demarcation time. The task generation system 170 may further determine, based on an anticipated rate of task processing at the on-demand code execution environment, when processing of those post-demarcation time data items would be expected to complete. Similarly, the task generation system 170 can determine how many new data items are excepted to be added to the data source 160 during processing of the those post-demarcation time data items, when processing of those new data items is expected to complete, etc., until the task generation system 170 determines an expected time at which new data items added into the data source 160 may be immediately processed (thus "catching up" or synchronizing the task generation system 170 with new modifications or additions at the data source 160). The task generation system 170 can then establish the demarcation time such that this expected synchronization time falls within a threshold value (e.g., five minutes, one hour, etc.).

Based on the establishment of a demarcation time, the task generation system 170 can thereafter begin to process both "new" data items (e.g., data items created or modified on or after the demarcation time) and "backlogged" data items (e.g., data items created or modified prior to the demarcation time) concurrently. Accordingly, at block 608, the task generation system 170 can begin processing "new" data items as a dynamic data stream. For example, the task generation system 170 can incrementally processes each "new" data item until no more "new" data items exist. Thereafter, the task generation system 170 may periodically monitor the data source 160 for any "new" data items, and process such data items immediately or substantially immediately, thus providing real-time (or substantially real-time) processing of data items as they are added to the data source 160. Concurrently, at block 610, the task generation system 170 can begin processing backlogged data items. Illustratively, processing of backlogged data items may occur according to the routine 500 described with respect to FIGS. 5A and 5B. In some instances, the processing of backlogged data items may occur according to a reverse chronological order (as opposed to the chronological ordering at which new data items are processed). Further, at block 612, the task generation system 612 can modify how backlogged data items are processed, based on activity of the "stream" of new data items. For example, the task generation system 612 can vary a rate at which backlogged data items are processed, based on a rate at which new data items are processed. Illustratively, the processing rate of backlogged data items may be modified such that the total rate of data items processed (e.g., both new and backlogged) satisfies a threshold value. In addition or alternatively to modifying a rate of backlog processing based on processing new data items, the task generation system 170 may in some instances vary the previously established demarcation time to account for variations in the stream of new data items. For example, where data items are added to the data source at a higher than expected rate, the demarcation time may be moved forward in time, such that the "catch up" time remains at or near a threshold value. Conversely, where data items are added to the data source at a lower than expected rate, the demarcation time may be moved backward, such that more data items are included in the "new" data stream.

Thereafter, the routine 600 ends at block 614. Thus, by implementation of the routine 600, the task generation system 170 may be configured to quickly "catch up" to processing new data items, and continue to process new data items substantially immediately, while ensuring that backlogged data items are eventually processed.

While the routine 600 is described above as a single routine 600, the routine 600 may also be executed as a collection of sub-routines or related routines. For example, block 608 may be implemented as a first independent routine, while blocks 610 and 612 are implemented as a second independent routine. While the routine 600 is described as implemented by the task generation system 170, in some embodiments, one or more portions of the routine 600 may be carried out by other systems or devices, including systems or devices within the on-demand code execution environment 110.

Figure 7:
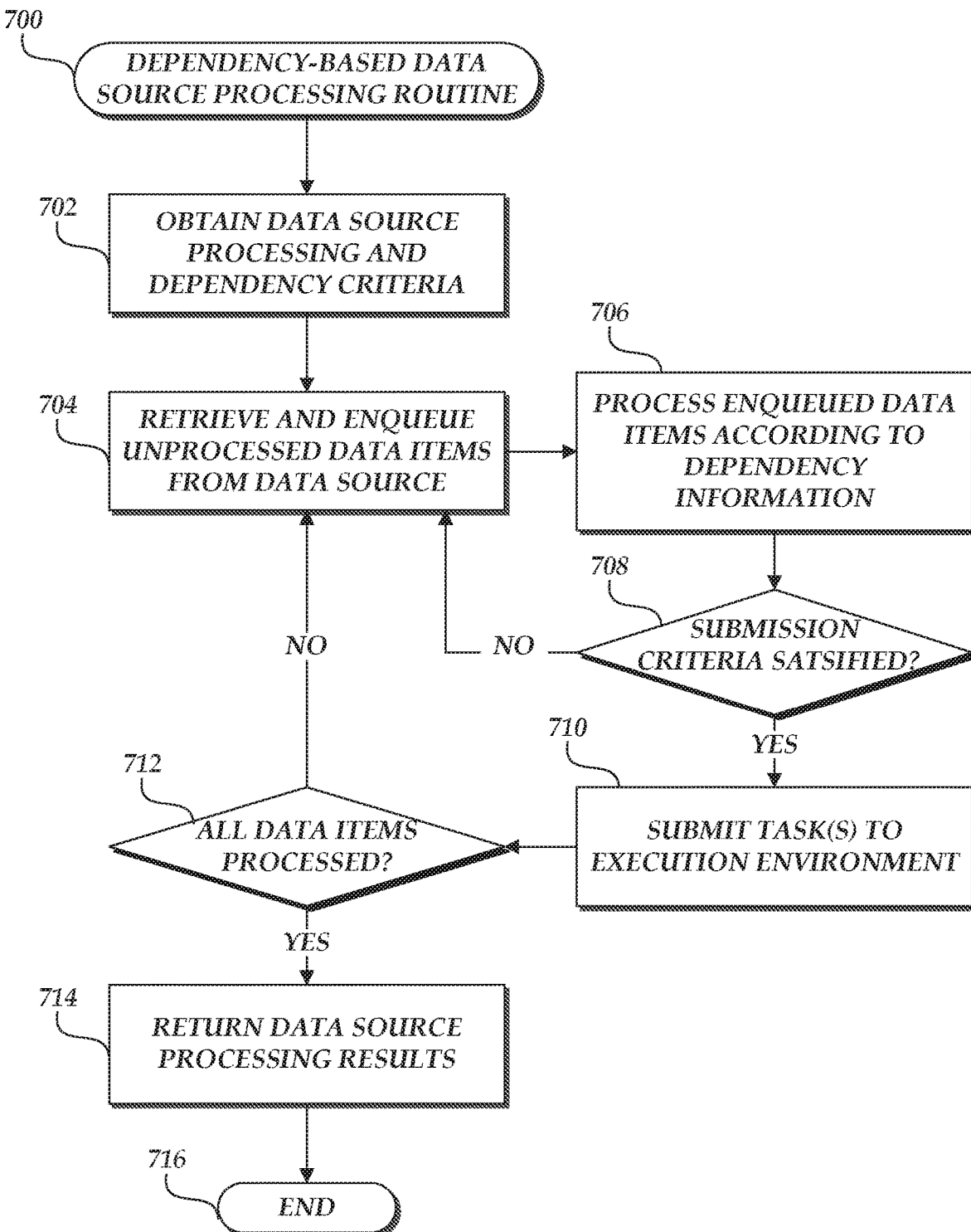
FIG. 7 depicts a flow chart showing an illustrative routine for ordering task calls to an on-demand code execution environment based on dependency criteria for data items within a data source.

As noted above, in some instances it may be desirable to control the ordering in which data items are processed at an on-demand code execution environment, such as in instances where processing of a first data item depends on prior processing of a second data item, or in instances where the processing of multiple data items shares a common dependency (e.g., a decryption key). FIG. 7 includes a flow chart depicting one illustrative routine 700 for submitted data items from a data source to an on-demand code execution environment in an order controlled based on dependency information for the data items. The routine 600 may be implemented, for example, by the task generation system 170.

The routine 700 of FIG. 7 begins at block 702, where the task generation system 170 obtains data source processing and dependency criteria. The data source processing criteria, as further described above, may include one or more items of information such as the identity of a data sources 160 from which to access data items, parameters for accessing the data sources, tasks on the on-demand code execution environment to call for processing of the data items, etc. Dependency criteria may generally include any information identifying dependencies in the processing of data items from the data source. In one embodiment, dependency criteria may identify dependencies between individual data items within the data store, such that a task for processing a first data item is dependent on or successful execution of a task for processing a second data item. In another embodiment, dependency information may indicate a shared dependency of multiple data items on a common piece of information, such that it is desirable (e.g., for efficiency purposes) to process the multiple data items together. In yet another embodiment, the dependency information may include other criteria for the ordering or grouping of tasks to process data items, such as a desired number of data items to process concurrently, a desired time of day to submit data items for processing, etc. The data source processing and dependency criteria may be obtained, for example, from a user or other source identified by the user, via a user interfaces, programmatic interfaces, APIs, CLIs, GUIs, etc.

At block 704, the task generation system 170 retrieves and enqueues unprocessed data items from the data source, as described in more detail in FIG. 5A (e.g., at blocks 506-520). While retrieval and enqueuing of data items is described as a distinct process in FIG. 7 for ease of description, implementation of block 704 may occur iteratively, such that data items are continuously retrieved and enqueued during implementation of the routine 700.

At block 706, the task generation system 170 processes the enqueued data items according to the obtained dependency information, to determine whether criteria for submission of tasks to the on-demand code execution environment has been satisfied at block 708. In one embodiment, submission criteria may establish which enqueued data items are available to be submitted to the on-demand code execution environment for processing. For example, where processing of a first data item depends on processing of a second data item, the task generation system 170 may utilize the dependency information for the first data item to establish submission criteria for the first data item, such that the first data item may be submitted for processing to the on-demand code execution environment only after successful processing of the second data item. In some instances, submission criteria may also require that at least a threshold number of data items are available to be submitted for processing to the on-demand code execution environment. For example, where dependency information indicates that a set of data items are associated with a shared dependency, the task generation system 170 may establish submission criteria such that data items, within the set of data items, are submitted to the on-demand code execution environment for processing only when a threshold number of data items are available to be submitted, or when no more data items will become available (e.g., based on retrieval from the data source, execution of other tasks, etc.). Such a threshold number may be set, for example, based on the number of data items that may be simultaneously processed by a task, or by a common computing device implementing multiple tasks. In some instances, implementation of block 706 may include the task generation system generating an ordering for data items within the cache based on the dependency data, such that data items are submitted according to the ordering as they satisfy the submission criteria. On subsequent implementations of block 706, the task generation system may reorder the initial ordering to account for any changes in the known data items (e.g., successful processing of one or more data items or the addition of new data items into the queue, which causes those or other data items to satisfy the submission criteria).

In the instance that the submission criteria are not satisfied, the routine 700 returns to block 704, where additional data items are retrieved from the data source and enqueued. Alternatively, where the submission criteria are satisfied, the routine 700 continues to block 710, where the task generation system 710 submits one or more tasks to the on-demand code execution environment corresponding to the data items available for submission, as determined in block 708. The call may include an API call or HTTP packet formatted according to the parameters of the on-demand code execution environment to specify a particular task (e.g., corresponding to a set of user-defined code requested to be executed at the on-demand code execution environment), as well as parameters to pass to the task, which may include the data item itself, or a reference to the data item (e.g., at the data source). In some instances, the specific task that is called on the on-demand code execution environment may vary based on the data item or parameters of the data item (e.g., such that data items of a first type are processed via a first task, and data items of a second type are processed according to a second task). Further, the specific task may in some instances vary based on a group of data items known to the task generation system, including both unprocessed and processed data items. For example, a user may provide task criteria to the task generation system may enabling the task generation system to vary a task based on previously processed data items (e.g., such that a first task is used for processing the first n data items, a second task is used for processing the second n data items, etc.) or based on enqueued data items (e.g., such that the task used varies based on the number of data items in the queue, attributes of those data items, etc.). Still further, the specific task may in some instances vary based on the dependencies associated with any given data item. For example, where processing a data item is not dependent on processing any other data item, a first task may be used to process the data item. Where no other data item is dependent on processing a data item, a second task may be used to process the data item. Where processing a data item is dependent on processing other data items, and where other data items depend on processing the data item, a third task may be used to process the data item, etc. As a further example, dependency information may be mapped as a graph, and the shape of the graph may be used to determine tasks to call in processing individual data items (e.g., forming nodes within the graph). Illustratively, a first task could be used to process data items within a broad dependency graph (e.g., wider than it is tall), while a second task could be used to process data items within a tall dependency graph (e.g., taller than it is wide). Additional or alternative factors may be used to modify the tasks on the on-demand code execution environment according to the needs of the task generation system.

At block 712, the task generation system 712 determines whether all data items from the data source have been processed by submission of tasks to the on-demand code execution environment. If all data items have not yet been processed, the routine 700 returns to block 704, where additional unprocessed data items (if any) are retrieved from the data source and enqueued at the task generation system 712 for processing. The routine 700 then continues, as described above, until all data items have been processed (e.g., a task has completed, or in some instances failed to complete, for each data item). The routine 700 then proceeds to block 714, where results of the routine 700 are returned to the user at the user computing device 102. Such results may indicate, for example, that the data items within the data source have been processed, specific results with respect to individual data items (e.g., results of a task call generated for the data item, errors incurred with respect to the data item, etc.), or information pertaining to the overall processing of the data items (e.g., total time taken, number of requests to the on-demand code execution environment 110, etc.). The routine 700 then ends at block 716.

While the routine 600 is described above as a single routine 700, the routine 700 may also be executed as a collection of sub-routines or related routines. For example, block 704 may be implemented as a first independent routine, while blocks 706 and 714 are implemented as a second independent routine. While the routine 700 is described as implemented by the task generation system 170, in some embodiments, one or more portions of the routine 700 may be carried out by other systems or devices, including systems or devices within the on-demand code execution environment 110.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for processing a plurality of data items within a data source via an on-demand code execution environment, the system comprising:
a non-transitory data store configured to implement an in-process data cache indicating data items, from the plurality of data items, that has been identified by the system but not yet processed at the on-demand code execution environment;
one or more processors configured to:

obtain, from a user computing device, information identifying a task, on the on-demand code execution environment, to utilize in processing the plurality of data items and dependency data indicating dependencies in processing individual data items from the plurality of data items, wherein the task corresponds to user-supplied code executable on the on-demand code execution environment, and wherein the dependency data indicates that execution of the task with respect to a first data item of the plurality of data items requires completion of execution of the task with respect to a second data item of the plurality of data items;

iteratively retrieve data items, from the plurality of data items, from the data source and enqueue the retrieved data items in the in-process data cache;

prior to submitting the first data item to the on-demand code execution environment for processing and prior to submitting the second data item to the on-demand code execution environment for processing, generate, at least partly by analyzing the data items within the in-process data cache according to the dependency data, an ordering by which data items within the in-process data cache will be submitted from the in-process data cache to the on-demand code execution environment for processing via execution of the task, the ordering specifying at least that the second data item within the in-process data cache is to be submitted to the on-demand code execution environment prior to the first data item within the in-process data cache; and while data items exist in the in-process data cache:
select a subset of data items from the in-process data cache for submission to the on-demand code execution environment, wherein the subset is selected, in accordance with the generated ordering, to include the second data item and to exclude the first data item;

submit a call to the on-demand code execution environment to execute the task to process the subset of data items;

receive an indication from the on-demand code execution environment that the subset of data items have been processed; and dequeue from the in-process data cache, the subset of data items of the in-process data cache that have been processed at the on-demand code execution environment.

2. The system of claim 1, wherein the dependency data further indicates that execution of the task with respect to at least two data items of the plurality of data items depends on common information.

3. The system of claim 2, wherein the common information is an encryption key.

4. The system of claim 1, wherein the data source corresponds to a plurality of distinct data sources.

5. The system of claim 1, wherein the task corresponds to a plurality of tasks, and wherein the information obtained from the user computing device further comprises information for determining an individual task, from the plurality of tasks, to call for processing a given data item from the plurality of data items.

6. The system of claim 1, wherein the ordering is generated independently of submission of data items in the in-process data cache to the on-demand code execution environment.

7. A computer-implemented method to process a plurality of data items within a data source via an on-demand code execution environment, the computer-implemented method comprising:

obtaining information identifying a task, on the on-demand code execution environment, to utilize in processing the plurality of data items and dependency data indicating dependencies in processing individual data items from the plurality of data items, wherein the task corresponds to user-supplied code executable on the on-demand code execution environment, and wherein the dependency data indicates that execution of the task with respect to a first data item of the plurality of data items requires completion of execution of the task with respect to a second data item of the plurality of data items;

retrieving the plurality of data items from the data source and, as data items are retrieved, enqueuing the retrieved data items in a data cache;

prior to submitting the first data item to the on-demand code execution environment for processing and prior to submitting the second data item to the on-demand code execution environment for processing, generating, at least partly by analyzing the data items within the data cache according to the dependency data, an ordering by which data items within the data cache will be submitted from the data cache to the on-demand code execution environment for processing via execution of the task, the ordering specifying at least that the second data item within the data cache is to be submitted to the on-demand code execution environment prior to the first data item within the data cache;

prior to submitting a call to the on-demand code execution environment to process the first data item from the data cache, submitting a call to the on-demand code execution environment to process the second data item from the data cache, wherein the second data item is selected for submission prior to the first data item according to the generated ordering and based at least partly on the dependency data indicating that execution of the task with respect to the first data item requires completion of execution of the task with respect to the second data item; and in response to processing of the second data item, submitting a call to the on-demand code execution environment to process the first data item from the data cache.

8. The computer-implemented method of claim 7, wherein the dependency data further indicates that execution of the task with respect to at least two data items of the plurality of data items depends on common information.

9. The computer-implemented method of claim 7, wherein enqueuing the retrieved data items in a data cache comprises obtaining identifiers for the retrieved data items and verifying that the identifiers do not correspond to identifiers of previous data items within the data cache.

10. The computer-implemented method of claim 9, wherein obtaining the identifiers for the retrieved data items comprises at least one of identifying keys of the data items within the data source, concatenating one or more attributes of the data items, or processing the data items according to a hash function.

11. The computer-implemented method of claim 7, wherein the data cache includes a first sub-cache indicating data items, from the plurality of data items, that has been retrieved from the data source but not yet processed at the on-demand code execution environment and a second sub-cache indicating data items, from the plurality of data items, that have been processed at the on-demand code execution environment.

12. The computer-implemented method of claim 7, wherein the first data item corresponds to a plurality of data items, and wherein execution of the task to process the plurality of data items is dependent on common information.

13. The computer-implemented method of claim 7, wherein the task corresponds to a plurality of tasks, and wherein the computer-implemented method further comprising selecting a first task, from the plurality of tasks, to utilize in processing the plurality of data items based at least in part on the dependency data.

14. The computer-implemented method of claim 7, wherein the information identifying the task and the dependency data is obtained via at least one of a user interface or a programmatic interface.

15. The computer-implemented method of claim 7, wherein the ordering is generated independently of submission of data items in the data cache to the on-demand code execution environment.

16. Non-transitory computer-readable media including computer-executable instructions to process a plurality of data items within a data source via an on-demand code execution environment, wherein the computer-executable instructions, when executed by a computing system, cause the computing system to:
 obtain information identifying a task, on the on-demand code execution environment, to utilize in processing the plurality of data items and dependency data indicating dependencies in processing individual data items from the plurality of data items, wherein the task corresponds to user-supplied code executable on the on-demand code execution environment, and wherein the dependency data indicates that execution of the task with respect to a first data item of the plurality of data items requires completion of execution of the task with respect to a second data item of the plurality of data items;
 retrieve the plurality of data items from the data source and, as data items are retrieved, enqueue the retrieved data items in a data cache;
 prior to submitting the first data item to the on-demand code execution environment for processing and prior to submitting the second data item to the on-demand code execution environment for processing, generate, at least partly by analyzing the data items within the data cache according to the dependency data, an ordering by which data items within the data cache will be submitted to the on-demand code execution environment for processing via execution of the task, the ordering specifying at least that the second data item within the data cache is to be submitted to the on-demand code execution environment prior to the first data item within the data cache; and
 submit a series of calls to the on-demand code execution environment to process the data items from the data cache, wherein calls within the series of calls are ordered according to the generated ordering to include a call to process the second data item prior to a call to process the first data item.

17. The non-transitory computer-readable media of claim 16, wherein the series of calls includes a plurality of calls to the on-demand code execution environment for processing at least partly concurrently, and wherein the plurality of calls correspond to calls to process data items, from the plurality of data items, that share a common dependency.

18. The non-transitory computer-readable media of claim 16, wherein the series of calls to the on-demand code execution environment is timed to include a delay between at least the call to process the second data item and the call to process the first data item.

19. The non-transitory computer-readable media of claim 18, wherein the delay is based at least in part an amount of time between submitting the call to process the second data item and receiving an indication from the on-demand code execution environment that the second data item is successfully processed.

20. The non-transitory computer-readable media of claim 16, wherein the dependency data further indicates that execution of the task with respect to at least two data items of the plurality of data items depends on common information.

21. The non-transitory computer-readable media of claim 16, wherein the computer-executable instructions cause the computing system to enqueue the retrieved data items in the data cache at least in part by obtaining identifiers for the retrieved data items and verifying that the identifiers do not correspond to identifiers of previous data items within the data cache.

22. The non-transitory computer-readable media of claim 21, wherein the computer-executable instructions cause the computing system to obtain the identifiers for the retrieved data items at least in part by at least one of identifying keys of the data items within the data source, concatenating one or more attributes of the data items, or processing the data items according to a hash function.

23. The non-transitory computer-readable media of claim 16, wherein the data cache includes a first sub-cache indicating data items, from the plurality of data items, that has been retrieved from the data source but not yet processed at the on-demand code execution environment and a second sub-cache indicating data items, from the plurality of data items, that have been processed at the on-demand code execution environment.

24. The non-transitory computer-readable media of claim 16, wherein the computer-executable instructions cause the computing system to modify the ordering for the data items based at least in part on at least one of data items enqueued in the data cache or data items processed by the on-demand code execution environment.

25. The non-transitory computer-readable media of claim 16, wherein the computer-executable instructions further cause the computing system, prior to submitting the series of calls, to verify that a set of submission criteria are met, and wherein the submission criteria specifies at least a threshold number of data items exist within the data cache.

26. The non-transitory computer-readable media of claim 25, wherein the threshold number of data items is based at least in part on a number of data items available for placement in the data cache.

27. The non-transitory computer-readable media of claim 16, wherein the ordering is generated independently of submission of data items in the data cache to the on-demand code execution environment.

* * * * *